United States Patent
Huang

(10) Patent No.: US 12,028,459 B2
(45) Date of Patent: Jul. 2, 2024

(54) MULTI-ACCESS EDGE COMPUTING NODE WITH DISTRIBUTED LEDGER

(71) Applicant: Xeniro, Shanghai (CN)

(72) Inventor: Enshen Huang, Shanghai (CN)

(73) Assignee: XENIRO, Shanghai (CN)

( * ) Notice: Subject to any disclaimer, the term of this patent is extended or adjusted under 35 U.S.C. 154(b) by 473 days.

(21) Appl. No.: 17/297,394

(22) PCT Filed: Dec. 17, 2018

(86) PCT No.: PCT/CN2018/121527
§ 371 (c)(1),
(2) Date: May 26, 2021

(87) PCT Pub. No.: WO2020/124317
PCT Pub. Date: Jun. 25, 2020

(65) Prior Publication Data
US 2022/0038289 A1    Feb. 3, 2022

(51) Int. Cl.
*H04L 9/32* (2006.01)
*G06F 16/27* (2019.01)
(Continued)

(52) U.S. Cl.
CPC ............ *H04L 9/3239* (2013.01); *G06F 16/27* (2019.01); *G06F 21/64* (2013.01); *H04L 9/3218* (2013.01); *H04L 9/3265* (2013.01); *H04L 9/50* (2022.05)

(58) Field of Classification Search
None
See application file for complete search history.

(56) References Cited

U.S. PATENT DOCUMENTS

2017/0243193 A1*  8/2017  Manian .............. G06Q 20/3829
2018/0082296 A1   3/2018  Brashers
(Continued)

FOREIGN PATENT DOCUMENTS

CN    108701325 A    10/2018
CN    108990002 A    12/2018
(Continued)

OTHER PUBLICATIONS

Fei, Y. and Jha, N.K., Jan. 2002. Functional partitioning for low power distributed systems of systems-on-a-chip. In Proceedings of ASP-DAC/VLSI Design 2002. 7th Asia and South Pacific Design Automation Conference and 15h International Conference on VLSI Design (pp. 274-281). IEEE. (Year: 2002).*
(Continued)

*Primary Examiner* — Luu T Pham
*Assistant Examiner* — Edward X Long
(74) *Attorney, Agent, or Firm* — Klarquist Sparkman, LLP

(57) ABSTRACT

It is provided a multi-access edge computing node located within a cellular coverage area supported by a base station of a mobile network operator, the multi-access edge computing node comprising at least one memory to store a chained data block, where each data block is coded with data of a past transaction in respect of a good or service; and at least one stock processor configured with functions that: include a new data block, to record a current transaction in respect of a good or service, into the chained data block in response to a signature, generated from processing the data of the current transaction with the coded data of the past transactions stored in the chained data block, being validated by a group of external multi-access edge computing nodes, wherein the multi-access edge computing node and the
(Continued)

group of external multi-access edge computing nodes are trusted, and communicate over a common channel.

20 Claims, 14 Drawing Sheets

(51) Int. Cl.
  *G06F 21/64* (2013.01)
  *H04L 9/00* (2022.01)

(56) References Cited

U.S. PATENT DOCUMENTS

| | | |
|---|---|---|
| 2018/0091524 A1 | 3/2018 | Setty et al. |
| 2018/0117446 A1 | 5/2018 | Tran et al. |
| 2018/0285839 A1 | 10/2018 | Yang et al. |
| 2018/0293553 A1 | 10/2018 | Dembo et al. |
| 2018/0308134 A1 | 10/2018 | Manning et al. |
| 2019/0014116 A1* | 1/2019 | Khi .................. H04L 63/12 |
| 2019/0051144 A1* | 2/2019 | David ............... G08B 21/0415 |
| 2019/0268138 A1* | 8/2019 | Mankovskii ........... G06Q 20/06 |
| 2020/0004846 A1* | 1/2020 | Camenisch ......... G06F 16/1834 |
| 2020/0034945 A1* | 1/2020 | Soundararajan ...... G06T 1/0021 |

FOREIGN PATENT DOCUMENTS

| | | |
|---|---|---|
| WO | WO2018/025028 A1 | 2/2018 |
| WO | WO2018/200120 A1 | 11/2018 |
| WO | WO2018/224635 A1 | 12/2018 |

OTHER PUBLICATIONS

Gaži, P., Kiayias, A. and Zindros, D., May 2019. Proof-of-stake sidechains. In 2019 IEEE Symposium on Security and Privacy (SP) (pp. 139-156). IEEE. (Year: 2019).*

Šimunić, S., Bernaca, D. and Lenac, K., 2021. Verifiable computing applications in blockchain. IEEE access, 9, pp. 156729-156745. (Year: 2021).*

International Search Report and Written Opinion of the International Searching Authority, mailed Sep. 18, 2019, for corresponding International Application No. PCT/CN2018/121527, 9 pages.

"Communication—extended European Search Report" from the European Patent Office for European Application No. EP18943668. 6—1213, dated Jul. 21, 2022, 9 pages.

First Office Action from Taiwan Intellectual Property Office, for Taiwan Patent Application No. 108125585, dated Nov. 2022, 13 pages.

* cited by examiner

MULTI-ACCESS EDGE COMPUTING NODE WITH DISTRIBUTED LEDGER

CROSS REFERENCE TO RELATED APPLICATION

This is the U.S. National Stage of International Application No. PCT/CN2018/121527, filed Dec. 17, 2018.

FIELD

The present invention relates to a multi-access edge computing node with a distributed ledger.

BACKGROUND

Decentralised ledger technology has attracted much interest in recent years due to its flexibility of applications: from providing an architecture for utility tokens that can be used to deploy built-in smart contracts.

However, block chain backed transactions suffer from several limitations. Due to the nature in which transactions are validated, which requires multiple machine consensus, this leads to latency when numerous transactions are simultaneously processed. Latency causes difficulties when scaling block chain technology to support internet of things (IoT) applications, whereby the IoT market is expecting exponential growth from $157b to $457b from 2016 to 2020, according to a Dec. 10, 2017 article published by Forbes. The very nature of block chain technology, being a decentralised ledger, has a security flaw known as a "51% attack", whereby if more than half of the machines validate a ledger containing erroneous records, it is possible for dishonest transactions to be erroneously processed as valid transactions. Privacy is also a concern, since past transactions can be obtained from which identities can be obtained.

While there are existing approaches that try to improve latency and improve security of block chain technology, many of these approaches address these drawbacks unilaterally, without fully capitalising on the capability of block chain technology.

The present invention seeks to addresses the above shortcomings and delivers a system that harnesses block chain technology more effectively.

SUMMARY OF THE INVENTION

According to one aspect of the invention, there is provided a multi-access edge computing node located within a cellular coverage area supported by a base station of a mobile network operator, the multi-access edge computing node comprising at least one memory to store a chained data block, where each data block is coded with data of a past transaction in respect of a good or service; and at least one stock processor configured with functions that: include a new data block to record a current transaction in respect of a good or service, into the chained data block in response to a signature, generated from processing the data of the current transaction with the coded data of the past transactions stored in the chained data block, being validated by a group of external multi-access edge computing nodes, wherein the multi-access edge computing node and the group of external multi-access edge computing nodes are trusted, and communicate over a common channel.

According to another aspect of the invention, there is provided a dedicated processor for installation at a multi-access edge computing node located within a cellular coverage area supported by a base station of a mobile network operator, the dedicated processor having electronics divided into logic partitions comprising a ledger management partition configured to share computational load of a stock processor of the multi-access edge computing node to include a new data block, to record a current transaction in respect of a good or service, into a chained data block stored in at least one memory of the multi-access edge computing node on which the dedicated processor is installed, in response to a signature, generated from processing the data of the current transaction with coded data of past transactions stored in the chained data block, being validated by a group of external multi-access edge computing nodes which are trusted: and a shielded transaction validation partition configured to: produce shielded data comprising data of the current transaction determined to require shielding; and formulate statements designed to prove a truth about whether content of the shielded data is known, with the shielded data being masked.

BRIEF DESCRIPTION OF THE DRAWINGS

Representative embodiments of the present invention are herein described, by way of example only, with reference to the accompanying drawings, wherein.

DETAILED DESCRIPTION

Figure 1:
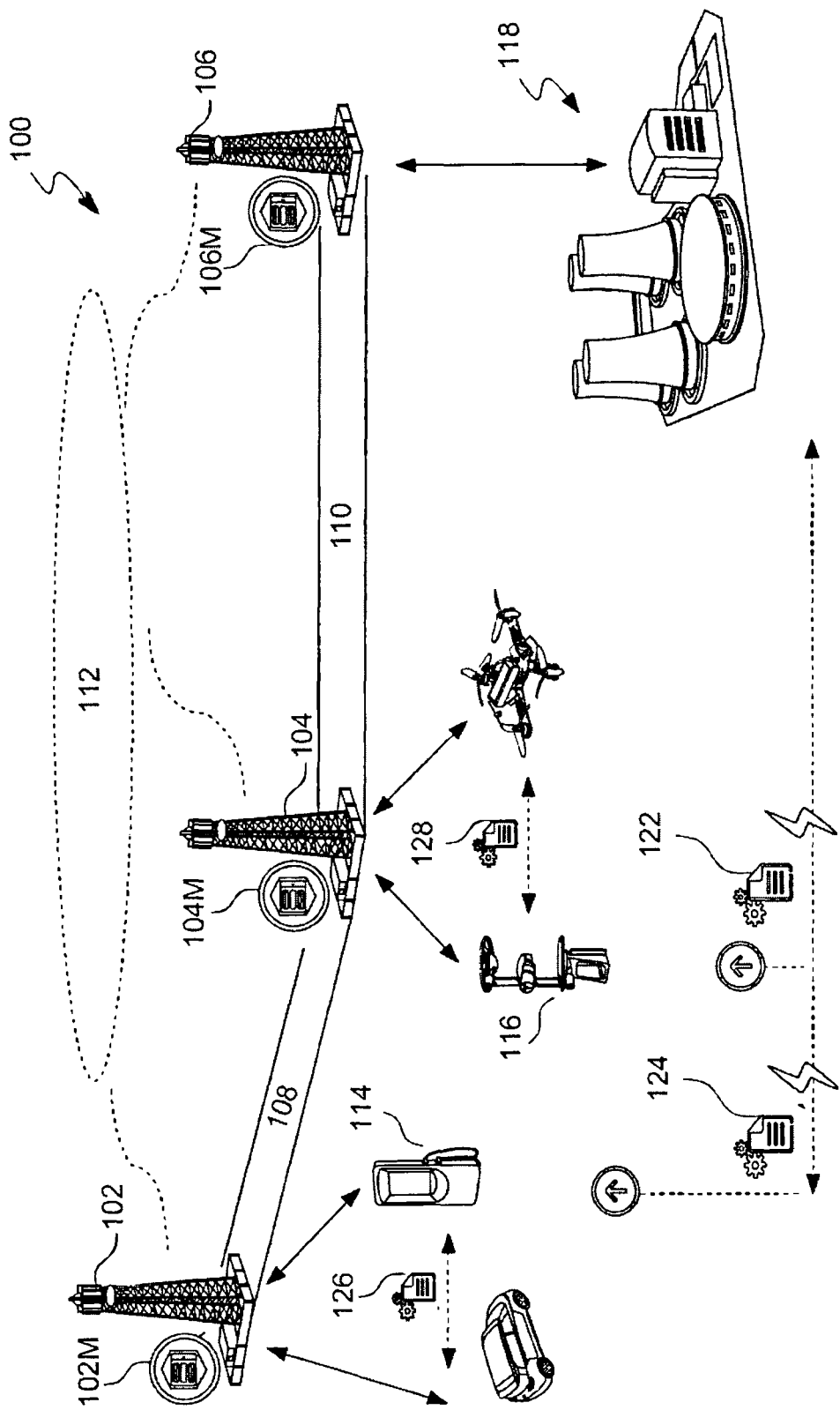
FIG. 1 is a schematic of a portion of a system comprising access points, each supporting a respective multi-access edge computing node.

In the following description, various embodiments are described with reference to the drawings, where like reference characters generally refer to the same parts throughout the different views.

The present application, in a broad overview, relates to a ledger that is distributed across a system of multi-access edge computing nodes. The ledger is a database storing records of entries of monitored transactions, distributed by each of the multi-access edge computing nodes hosting a replicate. In the context of IoT applications, a transaction may be automatically initiated by IoT devices themselves (i.e. machine to machine or M2M), provided certain conditions are met: or may require human intervention, such as an operator working an IoT device at one end (machine to human or M2H) or an operator working an IoT device at each end (human to human. H2H).

The distributed ledger is also synchronised in that when one of the hosted ledgers is updated to record data of a new transaction into past transaction data, its hosting multi-access edge computing node checks whether the updated ledger is in consensus with ledgers hosted in other multi-access edge computing nodes, updated with data of the same new transaction. Machine to machine validation is achieved when at least a majority of the other multi-access edge computing nodes are in agreement with the updated ledger. In one implementation, delegated proof of stake (DPoS) consensus is used, where agreement is sought from a percentage (e.g. 66%) of a selected group of multi-access edge computing nodes (called "witnesses"). The selected group of multi-access edge computing nodes are those that produce trusted results, i.e. multi-access edge computing nodes that produce updated ledgers that are in conformance when each of them record a new data block containing data of the new transaction. The group of multi-access edge computing nodes from which agreement is sought is voted by stakeholder multi-access edge computing nodes. These stakeholders are multi-access edge computing nodes possessing utility tokens providing a percentage ownership of the platform created by the system of multi-access edge computing nodes to host the distributed ledger. Since only trusted multi-access edge computing nodes validate an updated ledger, this reduces the probability of a "51% attack" from having the multi-access edge computing nodes adopt known "proof of work" teclmiques. Having only a selected number of multi-access edge computing nodes validate the updated ledger also reduces latency, compared to the "proof of work" approach. In one implementation, only 66% of an elected group of multi-access edge computing nodes perform the ledger update.

Each multi-access edge computing node is located within a cellular coverage area supported by a base station of a mobile network operator, such as being adjacent to the base station. The multi-access edge computing node operates under 4G and 5G frequency bands, in accordance with technical standards as defined by the European Telecommunications Standards Institute (ETSI) and 3GPP (3$^{rd}$ Generation Partnership Project) in respect of multi-access edge computing. Accordingly, the multi-access edge computing node is placed in proximity to the base station, to utilise the radio access network infrastructure of the base station that provides for cellular communication in these 4G and 5G frequency bands, so that the multi-access edge computing node operates under broadcast network conditions, rather than private network conditions. An example operating spectrum lies within 24 GHz to 86 GHz, to harness lower latency and higher throughput as compared to operating in this spectrum.

Collectively, the multi-access edge computing nodes provide for multi-access edge computing, a network architecture that supports greater computing and storage capacity at a network edge compared to those available to interconnected computer systems within the network, such as a central data centre or cloud location. Traditional distributed ledgers hosted on such network resources experience latency before transactions can reach these distributed ledgers to be processed and therefore processes which seek to rely on platforms that run such distributed ledgers cannot be effectively scaled. Conversely, having a distributed ledger hosted at the network edge harnesses the lower latency and better performance capabilities offered by multi-access edge computing for allowing task processing closer to end user devices. As such, multi-access edge nodes and their hosted distributed ledger, implemented in accordance with the present invention, provides a platform that facilities transactions to be performed on Internet of things (IoT) devices, i.e. any device which is embedded with electronics that enables the device to collect and exchange data that is in respect of the transaction, as long as the device can communicate with any of the multi-access edge computing nodes, e.g. through the cellular connection provided by the base station that supports the multi-access edge computing node.

The mobile network operator refers to any telecommunication company owning the rights to broadcast within au allocated frequency spectrum, with the base station providing the infrastructure to create a cell in a cellular network. Accordingly, the base station allows the mobile network operator to have wireless data communication over the allocated frequency spectrum and also a gateway to the core network serviced by the base station, the core network being part of interconnected computer systems, such as the Internet.

In addition to operating a protocol stipulating how consensus is achieved in their distributed ledger, each of the multi-access edge computing nodes also operates a protocol that has each of the multi-access edge computing nodes communicate over a common channel, like a communication path that is used for one base station to communicate with another base station. This restricts communication over direct communication paths that are used between base stations and reduces latency, as opposed to routing communication through the core network. This is in contrast to distributed ledgers that run on radio access networks.

The following disclosure provides implementation details of the multi-access edge computing node that facilitates the distributed ledger capability hosted by the multi-access edge computing node. Broadly, the multi-access edge computing node has a stock processor (being a standard server processor), along with a dedicated processor (being a specifically designed processor separate from the stock processor), responsible for updating the distributed ledger when a new data block is to be included. A policy engine is responsible for deciding an algorithm for use to validate transactions recorded into the distributed ledger and processing output of zero knowledge protocols which are used when transactions containing shielded data are to be recorded into the distributed ledger. This policy engine may also be further configured to determine whether computations that are undertaken to validate an update to the distributed ledger are undertaken by the stock processor or the dedicated processor.

FIG. 1 is a schematic of a portion of a system 100 comprising base stations 102, 104 and 106, each supporting a respective multi-access edge computing node 102M, 104M and 106M, so that each of the multi-access edge computing nodes 102M, 104M and 106M can tap into the data transmission and receipt capability of the cellular coverage that their respective base stations 102, 104 and 106 provide. In one implementation, this is achieved by locating each of the multi-access edge computing node 102M. 104M and 106M within the cellular coverage area of its respective base station 102, 104 and 106. In another implementation, this is achieved by locating the multi-access edge computing node 102M, 104M and 106M at or next to its respective base station 102, 104 and 106. For the sake of simplicity, all other multi-access edge computing nodes and their respective associated base station are not shown in the schematic for system 100.

In one implementation, each of the base stations 102, 104 and 106 belongs to the same mobile network operator. Communication between each of the multi-access edge computing nodes 102M, 104M and 106M to process a transaction is initiated by subscribers to this mobile network operator. In another implementation, each of the base stations 102, 104 and 106 belongs to a different mobile network operator. Communication between each of the multi-access edge computing nodes 102M. 104M and 106M to process a transaction is in accordance with conditions of an operator roaming partnership between the different mobile network operators, where the transaction is initiated by subscribers to each of the respective mobile network operators.

In yet another implementation the base stations 102, 104 and 106 belong to a third party, whereby each of them is used by different mobile network operators to facilitate communication between each of the multi-access edge computing nodes 102M, 104M and 106M to process a transaction initiated by parties that subscribe to different mobile network operators. For instance, base station 102 may be used by mobile network operators A, B and C, so that the multi-access edge computing node 102M will first receive notification if a transaction is initiated by a subscriber of either mobile network operator A, B and C while in the cellular coverage area of base station 102.

Communication between the multi-access edge computing node 102M to the other multi-access edge computing nodes 104M and 106M to validate a transaction (e.g. occurring at an electric vehicle (EV) charging station 114, where the two transacting parties are a charging station operator and an EV operator) will occur over communication path 108, 110 that the base stations 102, 104 and 106 use to communicate data with each other, rather than being routed through a mobile network operator core network 112. The establishment of a common channel along the communication path 108, 110 to isolate communication between the multi-access edge computing nodes 102M, 104M and 106M serves to reduce latency time for processing of the transaction (e.g. between the charging station operator and the EV operator). Even in instances where validating, for example a cross border transaction, requires communication with the mobile network operator core network 112 to draw resources (such as to acquire a currency exchange rate for the cross border transaction, i.e. when utility tokens owned by a transacting party at one end is in a jurisdiction different from a jurisdiction in which a transacting party of the other end is located), the common channel along the communication path 108, 110 is still utilised by the multi-access edge computing nodes 104M and 106M to validate the cross border transaction. The communication path 108, 110 may be realised using, wired or wireless means.

Each of the multi-access edge computing nodes 102M, 104M and 106M has at least one memory to store a chained data block. A chained data block is essentially a record of a transfer of ownership during transactions from the first to the most recent, so that the chained data block provides a ledger function that is shared by the multi-access edge computing nodes 102M, 104M and 106M. Its data structure is a hash pointer to back-linked blocks of transactions. Each block is identifiable by a hash, generated for example using the SHA256 cryptographic hash algorithm, on the header of the block. The header of each block references a previous block. Each block contains the hash of its parent inside its own header. There lays a chain going all the way back to the first block created, also known as the genesis block, linked together by a sequence of hashes.

Since the system 100 does not have a centralised body to authenticate any of its supportable transactions, but uses machine to machine validation, each of the multi-access edge computing nodes 102M, 104M and 106M relies on the ledger function of the chained data block to determine whether there is sufficient assets to execute a new transaction; the assets retelling to, for example, whether there is stock for the good or funds in a digital wallet to pay for the good.

Figure 2:
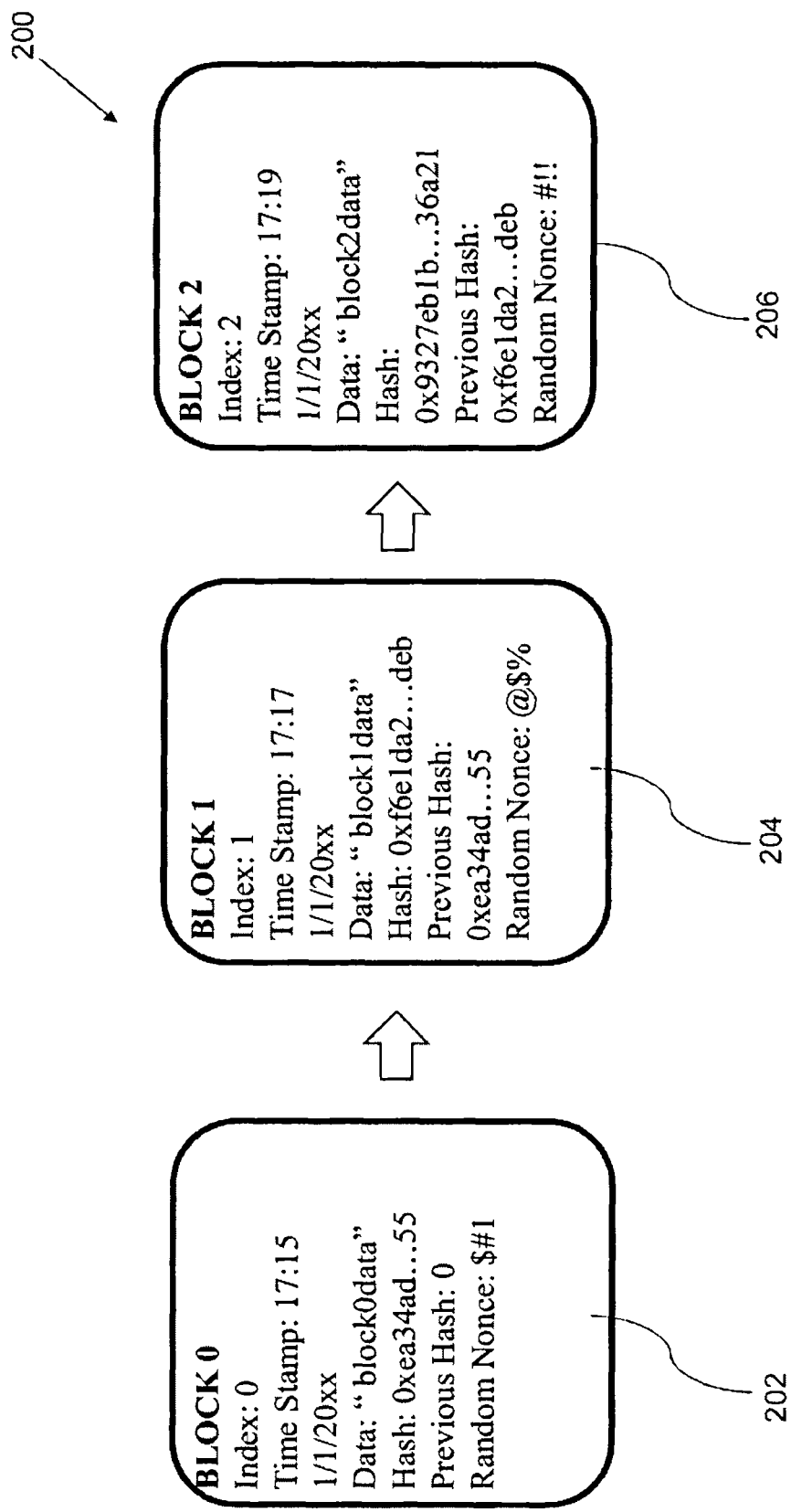
FIG. 2 shows a schematic of a protocol used to construct a chained data block in a ledger shared by each of the multi-access edge computing nodes of FIG. 1.

FIG. 2 shows a schematic of a protocol 200 used to construct a chained data block in each of the multi-access edge computing nodes 102M, 104M and 106M, the construction being based on a delegated proof of stake principle as explained in greater detail below. To simplify the explanation of the construction of the chained block of data. FIG. 2 assumes that each of the multi-access edge computing nodes 102M, 104M and 106M is trusted, i.e. they are amongst the witnesses of all multi-access edge computing nodes (i.e. including those that are not shown in FIG. 1) through majority vote. These witness multi-access edge computing nodes are responsible for ensuring the integrity of the shared ledger, i.e. they validate a transaction for recording into the shared ledger. Agreement is not required from all of the witness multi-access edge computing nodes, but only a majority of them (e.g. 66%, although any other pre-defined percentage may be set) to validate the transaction. In one implementation, the number of utility tokens that are distributed nodes is finite and owned by stakeholders, where the stakeholders will continuously monitor for the best performing multi-access edge computing nodes and vote them to be trusted to be the witness multi-access edge computing nodes. In one implementation, there are 101 multi-access edge computing nodes acting as witnesses, to which consensus has to be reached by 66 or 67 of them. However, in another implementation, a different number of multi-access edge computing nodes (i.e. not necessarily 101) act as witnesses, while another percentage (i.e. not necessarily 66%) of the witness multi-access edge computing nodes is required to reach consensus. The number of witness multi-access edge computing nodes 104M and 106M and their percentage to reach consensus is in accordance with network settings, which may be determined by parties called "delegates", which is described later in more detail in FIG. 14. Ensuring that ledger consensus exists within a predetermined percentage of all the multi-access edge computing nodes reduces the processing time taken to arrive at such consensus.

During initialisation, the shared ledger has no content, so that information of a first transaction, "block0data", becomes content of a first data block 202 (the genesis block) for inclusion into the shared ledger of any of the multi-access edge computing node 102M, 104M and 106M. The information provided by "block0data" depends on the nature of the transaction that is being recorded. For instance if the transaction relates to the purchase of a good or service, the information may include one or more of pointers that can give detail on: the type of good or service, its cost: details of a digital wallet used to fund it and the balance of the digital wallet thereafter: an inventory from which the good is to be drawn: and an identity of the parties to the transaction (such as seller and purchaser, and the shipper from the seller to the purchaser). If the transaction relates to supply chain management, the information may include one or more of pointers that can give detail on: the type of good or service being monitored, their respective cost price and selling price: an inventory of a warehouse from which a good is stocked: an inventory of a location to which the good is delivered: an identity of the warehouse where the good is stocked; an identity of the location to which the good is delivered; an identity of the party delivering the good; and an identity of the supplier of the good or service. Such information exists as data (i.e. a string of computer bits). A combination of "block0data", a hash value of a previous data block and a random nonce becomes input to a hash function. Since there are no previous data blocks, the previous hash value is "0", so that the hash value of the first data block 202 is the hash value of "block0data". The hash function is such that for any input, its output is a string of random letters and numbers, where the same input would always give the same string of output, but any change in the input would cause the output to change randomly. The application here is to solve a math problem where the output is in a specific data format (such as starting with a predefined combination of characters, e.g. seven zeros or a mixture of letters and numbers), so that the random nonce is repeatedly changed to produce such an output. In the case of FIG. 2, the hash value of the first data block 202 is "0xea34ad . . . 55", which becomes the signature of the first data block 202, with "$#1" being the random nonce found to produce this hash value. Assuming, for the sake of simplicity, that the transaction of "block0data" is the first of its kind, the hash value "0xea34ad . . . 55" is time stamped, dated, serialised with an index value "0" to successful create the first data block 202, for referencing back from later chained data blocks. The successful creation of the first data block 202 is broadcast over the communication path 108, 110 that the base stations 102, 104 and 106 use to communicate data with each other, for each of the multi-access edge computing nodes 102M, 104M and 106M to keep a copy of the first data block 202.

Information of a second transaction, "block1data" for inclusion as a second data block 204 into the shared ledger is as follows.

The content of "block1data" varies depending on the nature of the second transaction, so that the above comments regarding "block0data" equally apply. A combination of "block1data", the hash value of the first data block 202 (i.e. "0xea34ad . . . 55") and a random nonce becomes input to a hash function. In the case of FIG. 2, the hash value of the second data block 204 is "0xf6e1da2 . . . deb", which becomes the signature of the second data block 204, with "@$ %" being the random nonce found to produce this hash value.

All the multi-access edge computing nodes 102M, 104M and 106M will receive a notification of the second transaction seeking to be recorded in the shared ledger, where each will then seek to solve to obtain a signature of the second data block 204. Assuming that the multi-access edge computing node 102M is the first to obtain the signature of the second data block 204, the multi-access edge computing node 102M broadcasts the signature of the second data block 204 to the multi-access edge computing node 104M and multi-access edge computing node 1061\4, which from the perspective of the multi-access edge computing node 102M are external multi-access edge computing nodes that are trusted. Each of the multi-access edge computing nodes 104M and 106M validates the signature of the second data block 204 by referencing the previous validated data block, namely the first data block 202 ("block0data"), through the hash value of the first data block. The hash of the first data block 202 and the random nonce are then hashed to determine whether an output is produced having the earlier described specific data format (i.e. starting with a predefined combination of characters, e.g. seven zeros or a mixture of letters and numbers). If so, the signature of the second data block 204 is validated, i.e. consensus is reached by the multi-access edge computing nodes 104M and 106M. With consensus determined, the hash value "0xf6e1da2 . . . deb" is time stamped, dated, serialised with an index value "1", resulting in the successful creation of the second data block 202. Since the second transaction occurs after the first transaction, the second data block 204 has a later time stamp of "17:17" compared to the time stamp "17:15" of the first data block 202. The successful creation of the second data block 204 is broadcast over the communication path 108, 110 that the base stations 102, 104 and 106 use to communicate data with each other, for each of the multi-access edge computing nodes 102M, 104M and 106M to keep a copy of the second data block 204.

Information of a third transaction. "block2data", for inclusion as a third data block 206 into the shared ledger follows a similar procedure to that of inclusion of the second transaction, "block1data" as the second data block 204 into the shared ledger.

The content of "block2data" varies depending on the nature of the third transaction, so that the above comments regarding "block0data" equally apply. A combination of "block2data", the hash value of the second data block 202 (i.e. "0xf6e1da2 . . . deb") and a random nonce becomes input to a hash function. In the case of FIG. 2, the hash value of the third data block 206 is "0x9327eb1b . . . 36a21", which becomes the signature of the third data block 206, with "#!!" being the random nonce found to produce this hash value.

All the multi-access edge computing nodes 102M, 104M and 106M will receive a notification of the third transaction seeking to be recorded in the shared ledger, where each will then seek to solve to obtain a signature of the third data block 206. Again assuming that the multi-access edge computing node 102M is the first to obtain the signature of the third data block 206, the multi-access edge computing node 102M broadcasts the signature of the third data block 206 to the multi-access edge computing node 104M and multi-access edge computing node 106M, which from the perspective of the multi-access edge computing node 102M are external multi-access edge computing nodes that are trusted. Each of the multi-access edge computing nodes 104M and 106M validates the signature of the third data block 206 by referencing the previous validated data block, namely the second data block 204 ("block1data"), through the hash value of the second data block. The hash of the second data block 204 and the random nonce are then hashed to determine whether an output is produced having the earlier described specific data format (i.e. starting with a predefined combination of characters, e.g. seven zeros or a mixture of letters and numbers). If so, the signature of the third data block 206 is validated, i.e. consensus is reached by the multi-access edge computing nodes 104M and 106M. With consensus determined, the hash value "0x9327eb1b . . . 36a21" is time stamped, dated, serialised with an index value "2", resulting in the successful creation of the third data block 206. Since the third transaction occurs after the second transaction, the third data block 206 has a later time stamp of "17:19" compared to the time stamp "17:17" of the second data block 204. The successful creation of the third data block 206 is broadcast over the communication path 108, 110 that the base stations 102, 104 and 106 use to communicate data with each other, for each of the multi-access edge computing nodes 102M, 104M and 106M to keep a copy of the third data block 206.

Returning to FIG. 1, the system 100 is shown to support a use case of smart contracts 122, 124 that relate to managing of power usage, which sees the provision of power from a power plant 118 to a drone charging station 116 and an electric vehicle (EV) charging station 114. A small contract refers to a digital contract, which is a contract whose terms and conditions are programmed into computer code, stored and replicated across a distributed ledger. Deployment of the smart contract into the distributed ledger is done by the power plant 118 communicating with the multi-access edge computing node 106M, for being closest. The smart contract 122 for drone charging and the smart contract 124 for EV charging may use different terms and conditions, which can be accommodated by the distributed ledger of the multi-access edge computing nodes 102M, 104M and 106M.

FIG. 1 shows that the EV charging station 114 is in proximity to the multi-access edge computing node 102M, so that should a transaction (such as charging of an electric vehicle) be initiated in accordance with smart contract 126, access to having the transaction processed by the distributed ledger hosted by the system 100, would be through the multi-access edge computing node 102M. Similarly, the drone charging station 116 is in proximity to the multi-access edge computing node 104M, so that should a transaction (such as charging of a drone) be initiated in accordance with smart contract 128, access to having the transaction processed by the distributed ledger hosted by the system 100, would be through the multi-access edge computing node 104M. With reference to FIG. 2, the blockchain in the distributed ledger could be adapted to, for example, cater for consensus agreement as to whether a digital wallet has sufficient funds to pay for a requested amount of power, from analysing a new transaction against past transactions. It will be appreciated that while only an EV charging station 114 and a drone charging station 116 are shown, any other platforms that adopt the distributed ledger hosted by the system 100 can also utilise the distributed ledger by tapping into the most proximate multi-access edge computing node. Each of the multi-access edge computing nodes receive notifications of a transaction being sought to be recorded in the distributed ledger through the cellular connection provided by their associated base station.

In addition to managing power usage, other smart contracts supportable by the distributed ledger of the system 100 include purchase and sales contracts, crediting and debiting of a digital wallet, tracking of resources in a supply chain, the streaming of media content and the monitoring of road traffic conditions.

Figure 3:
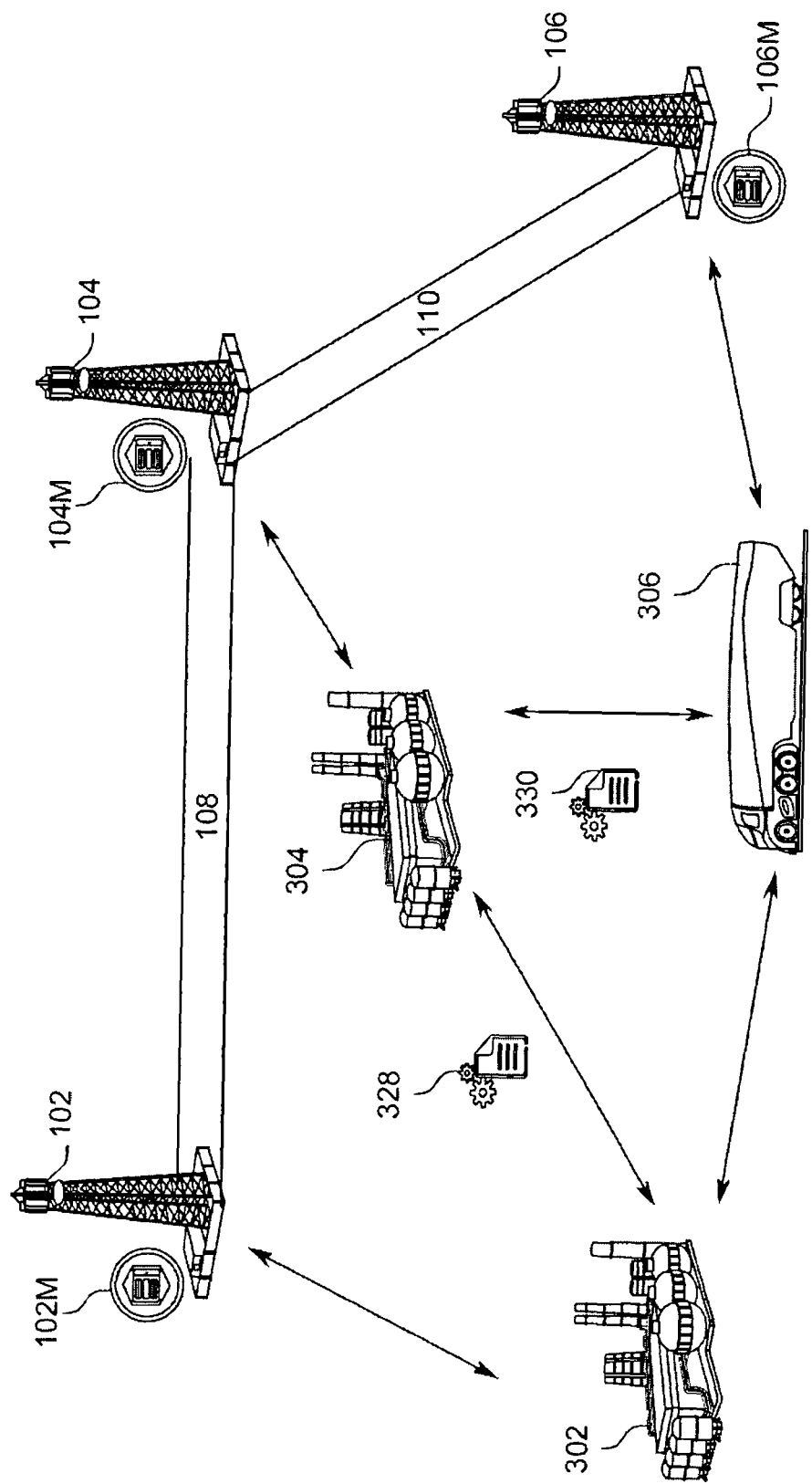
FIG. 3 shows a use case of smart contracts that relate to supply chain management.

FIG. 3 shows a use case of smart contracts 328 and 330 that relate to supply chain management, these smart contracts 328 and 330 being written into the ledgers of the multi-access edge computing nodes 102M, 104M and 106M. Similar to FIG. 2, each of the parties (namely a primary manufacturer 302, a subcontracted manufacturer 304 and a logistics company 306 delivering the finished goods on behalf of the subcontracted manufacturer 304) communicate status of a good to the closest multi-access edge computing node 102M, 104M and 106M. The smart contract 328 may assist with supply chain management as follows.

The primary manufacturer 302 subcontracts certain manufacturing parts to the subcontractor manufacturer 304. They both initiate a smart contract 328 based on agreed terms and conditions. The subcontractor manufacturer 304 then deploys a smart contract 330 with the logistics company 306 in delivering the final product to the primary manufacturer 302. All smart contracts 328 and 330 are logged on the distributed ledger from which the primary manufacturer 302 can track in real-time events prior to the arrival of the final good.

Figure 4:
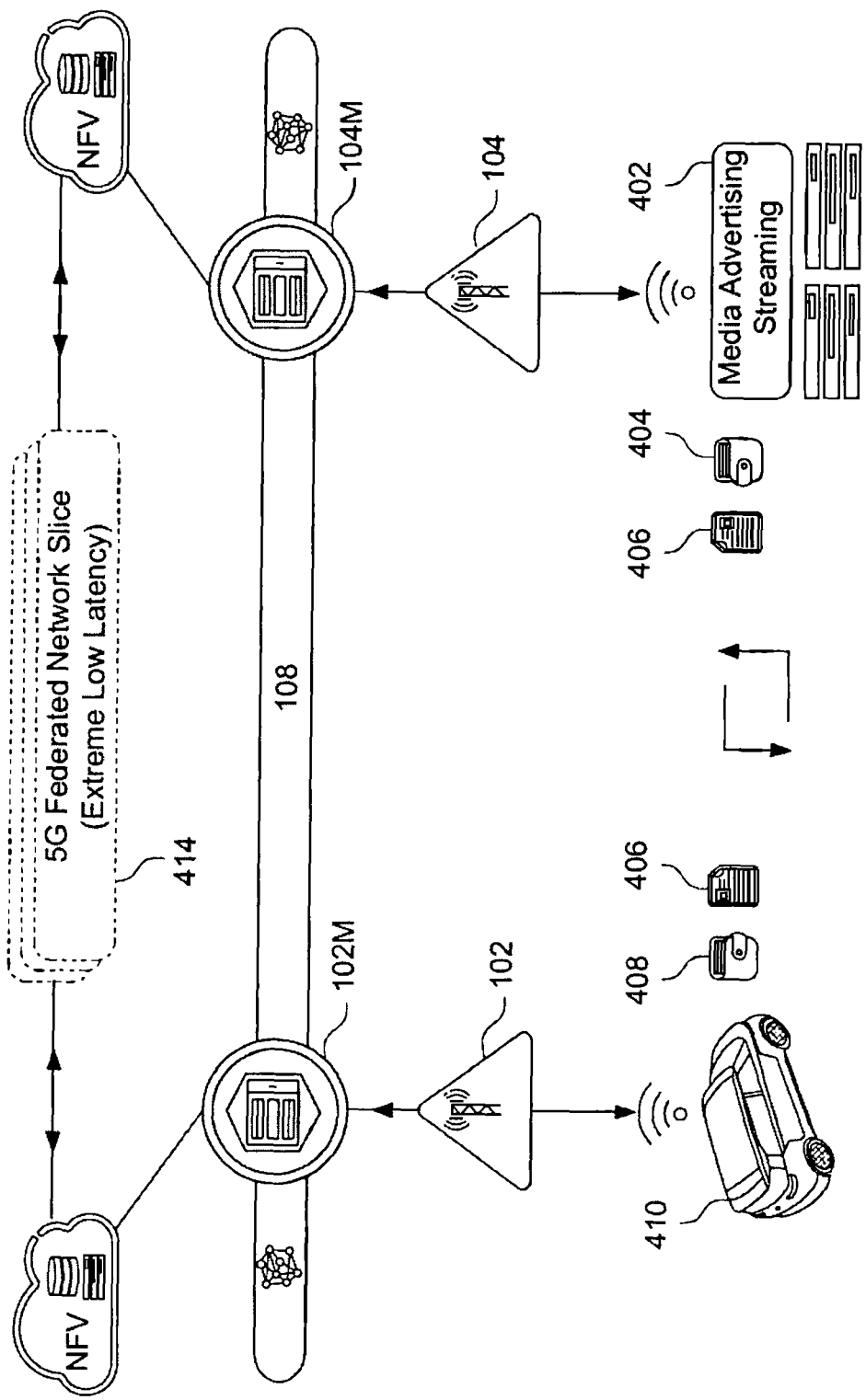
FIG. 4 shows a use case of a smart contract that relates to streaming media from a source to a recipient device.

FIG. 4 shows a use case of a smart contract 406 that relate to streaming media from a source 402 to a recipient device (e.g. a monitor, speaker or both) provided inside a vehicle 410. The base station 102 supporting the multi-access edge computing node 102M may be situated in a different region (e.g. the US) from that of the base station 104 supporting the multi-access edge computing node 104M (e.g. in Asia), so that a US based mobile network operator uses the base station 102, while an Asian based mobile network operator uses the base station 104. The smart contract 406 is coded to account for regulation requirements in the different region in which each party resides (the source 402 being in Asia and the vehicle 410 being in the US), with digital wallets 406 and 408 being used to secure payment for the media being streamed from the source 402 to the recipient device inside the vehicle 410. Similar to FIG. 1, the distributed ledger hosted by the multi-access edge computing nodes 102M and 104M is adapted to cater for consensus agreement with regard to the status of each of the digital wallets 406 and 408 when processing the media stream, from analysing a new transaction against past transactions.

Network slicing 414 is deployed by mobile network operators network function virtualisation (NF') core network. The source 402 and the monitor in the vehicle 410 become parties to the virtual network, where the virtual network allows the correct level of connectivity allowing the source 402 to communicate with the recipient device inside the vehicle 410. This is particularly advantageous since IoT may be customisable elements (e.g. a simple circuit board with the necessary electronics to perform their specific purpose), rather than a fill-fledged computing terminal. Since such elements may run their own architecture, the need for them to communicate with high data rate, low latency and good QoS (Quality of Service) becomes important, which is facilitated by them being part of the virtual network. The distributed ledger then provides the backbone architecture to ensure that transactions in accordance with smart contracts that each of these elements are designed to support can be validated.

The use case of FIG. 4 applies in a scenario of federated network slicing utilising 5G technology that offers cross border intercontinental services as follows. Assume an autonomous taxi company (based in the US) has signed up with a multimedia advertising company (based in Asia) for providing advertising services within the in-car system. Both companies are located in different continents. There is an open slot for a five minutes advertising campaign. The multimedia advertising company will initiate a smart contract through the multi-access edge computing nodes 102M with the taxi company (confer reference numeral 410), once the payment is validated on the distributed ledger. The service will be streamed through the multi-access edge computing nodes 102M with 5G connectivity that runs, deep inside the Asian operators visualized core network applying specific federated network slices with guaranteed QoS. This service will also be delivered through the counter-party operator's 5G network and multi-access edge computing nodes 104M infrastructure on the US continent and directly onto system panels of autonomous vehicles. This network slice will be made available on both operator platforms, preferably with servers hosted on their respective data centres, specifically for mobile network operators that want to maintain all network services across different operator footprints that require inter-operator agreements.

Figure 5:
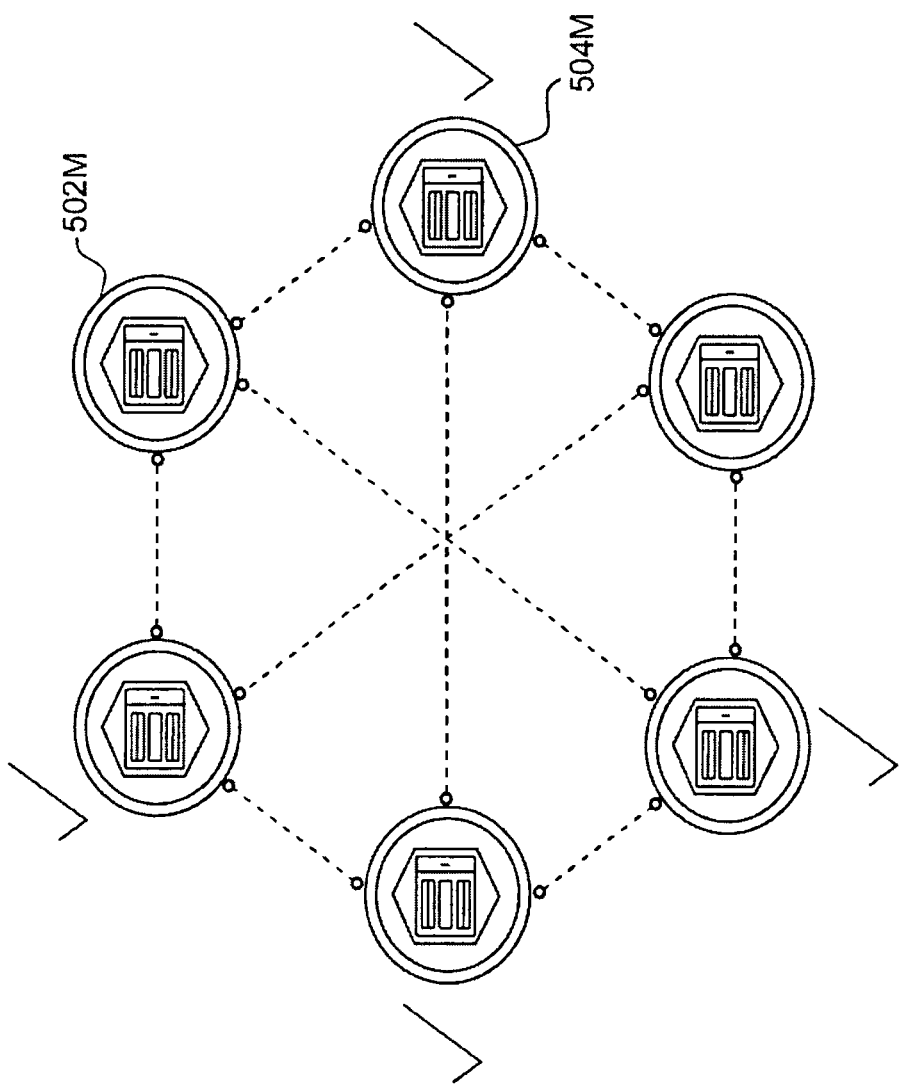
FIG. 5 shows a schematic of multi-access edge computing nodes that are distributed across the system to explain how they reach consensus.

FIG. 5 shows a schematic of multi-access edge computing nodes 502M, 504M that are distributed across the system 100 to explain how they reach consensus. With reference to FIG. 1, the respective base stations of the multi-access edge computing nodes 502M, 504M are not shown for the sake of simplicity.

The multi-access edge computing nodes 502M, 504M shown in FIG. 5 are witnesses that are allowed to validate new blocks that are to be added into the distributed ledger. As such, the delegated proof of stake principle described in FIG. 2 does not require for all of the multi-access edge computing nodes of the system to validate a transaction before the distributed ledger is updated with the transaction, thereby allowing for the transaction to be executed. Further, it is also not required for all of the witness multi-access edge computing nodes 502M. 504M to validate a transaction. Rather, it would be sufficient that a group of these multi-access edge computing nodes 502M, 504M validate the transaction. In the case of FIG. 5, a transaction is validated if 66% of the nodes reach consensus on the transaction, i.e. 4 out of the 6 multi-access edge computing nodes 502M, 504M (namely the multi-access edge computing nodes 504M, while it is not required for the multi-access edge computing nodes 502M to validate the transaction).

Figure 6:
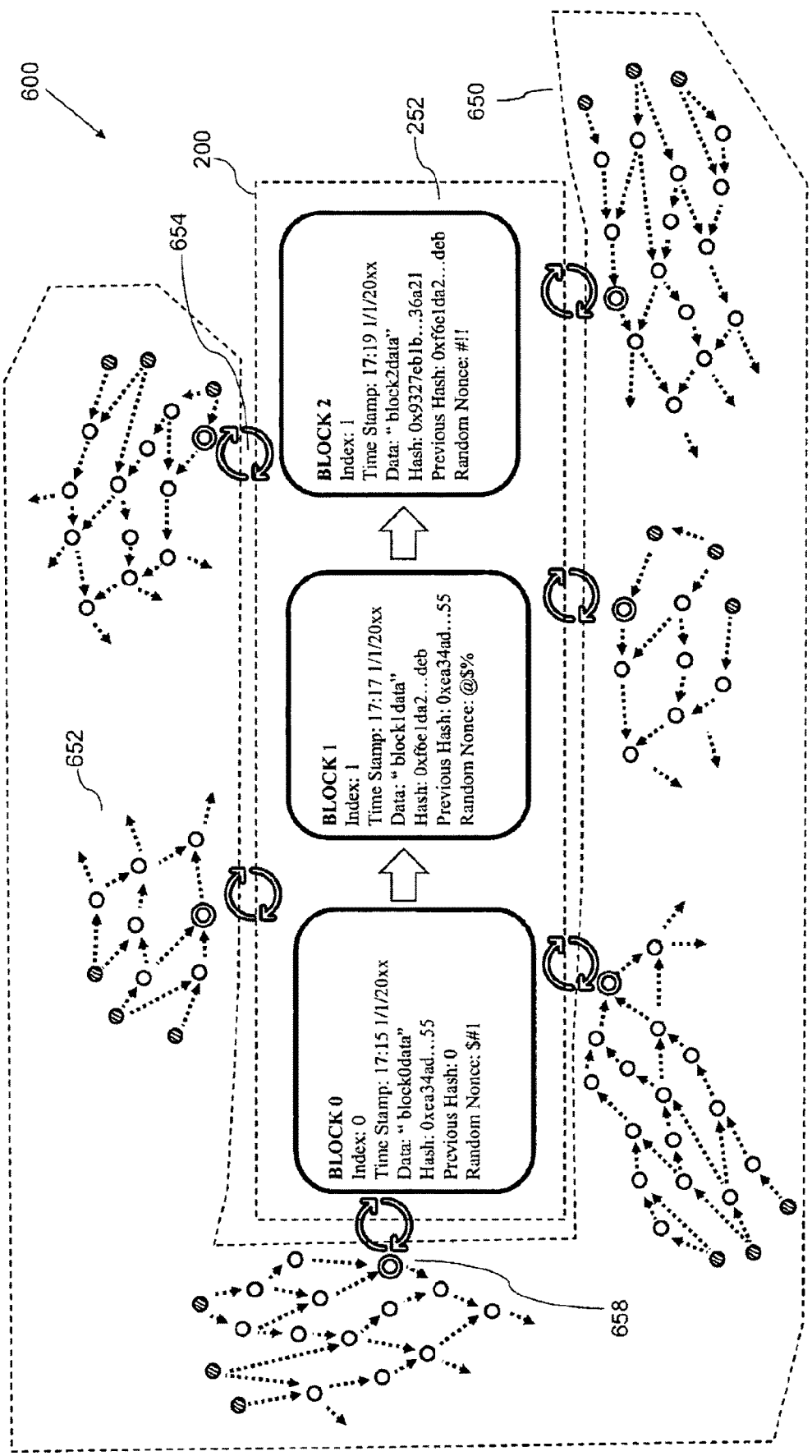
FIG. 6 provides a schematic of a hybrid protocol that is used by the distributed ledger of the system shown in FIG. 1.

FIG. 6 provides a schematic of a hybrid protocol 600 that is used by the distributed ledger of the system 100 shown in FIG. 1.

The hybrid protocol 600 has two layers. The protocol 200 used by the first layer was described in FIG. 2 and provides a main chain 252 to record transactions made in respect of goods or services, that are in accordance with terms and conditions of a smart contract. Use cases were described in FIGS. 1, 3 and 4.

The protocol 650 is used by the second layer to control one or more side chains 652 of data blocks that link to a designated data block of the main chain 252 controlled by the protocol 200 used by the first layer. The side chains 652 can be used to record transactions made in respect of goods or services belonging to a different category from those recorded in the main chain 252. The protocol 650 uses algorithms that are based on directed acyclic graph mathematical concepts.

The purpose of the one or more side chains 652 is to offload computation off the main chain 252 onto the one or more side chains 652 of data blocks. While described herein as data blocks, it will be appreciated that they can be understood as data graphs, since directed acyclic graph mathematical concepts are used. The one or more side chains 652 of data blocks offloads computation because each of them can be defined by a custom rule-set, which is in accordance with the principles of the protocol 650 used by the second layer. This allows for the one or more side chains 652 of data blocks to be optimised for applications that require high speeds or lightweight computation, while conserving the main chain 252 for applications that require heavyweight computation. Applications that require lightweight computation refer to transactions with no underlying contract or are regulated by an underlying contract where compliance to its terms and conditions are quickly validated by the multi-access edge computing nodes of the system 100 shown in FIG. 1. Applications that require heavyweight computation refer to transactions that are regulated by an underlying contract where validation of compliance to its terms and conditions takes comparatively more processing power and time.

Each of the one or more side chains 652 of data blocks synchronises 654 with the main chain 252 at a designated data block of the side chain 652 (denoted using reference numeral 658) to reconcile records stored in the main chain 252 by updating the main chain 252 with transactions that are recorded in the side chain 652. The creation of these side chains 652 and their synchronisation with the main chain 252 is described in more detail in FIG. 7.

Figure 7:
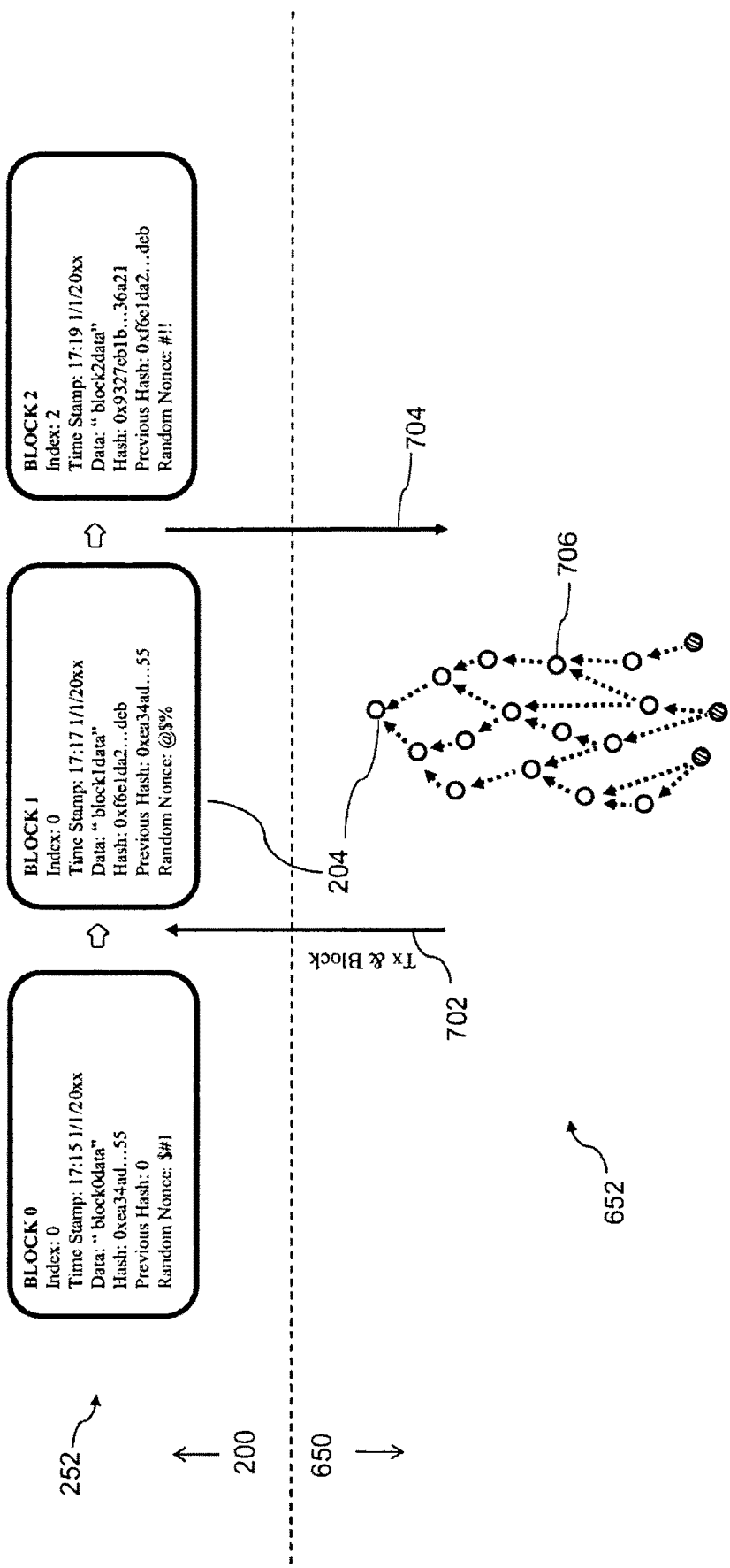
FIG. 7 provides a schematic of the interaction of protocols used in the distributed ledger of the system shown in FIG. 1.

FIG. 7 provides a schematic of the interaction of the protocol 200 used by the first layer and the protocol 650 used by the second layer in the distributed ledger of the system 100 shown in FIG. 1. This interaction is illustrated on the chained block of data shown in FIG. 2 and occurs on the second data block 204, which in the example shown in FIG. 7 is the root node of the side chain 652. The interaction uses a two way peg approach which is described in greater detail below. At the point when one or more of the multi-access edge computing nodes 502M, 504M (refer FIG. 5) is validating the second data block 204, one of these nodes receives a request to create a side chain 652 of data blocks that extends from the main chain 252 of data blocks (represented using the arrow 702 in FIG. 7). This causes assets to be moved from the main chain 252 to the side chain 652 because transactions are to be recorded on the side chain 652 and assets are required to effect the transactions. Assets do not necessarily refer to digital currency or tokens, but also include inventory used to effect transactions of goods or services, depending on the data recorded in the main chain 252 and the side chain 652. The moved assets are flagged to be locked in the main chain 252 of data blocks, which causes such locked assets to be not usable to effect transactions recorded on the main chain 252. To synchronise the main chain 252 and the side chain 652, two waiting periods are defined: a confirmation period and a contest period.

The confirmation period of a transfer to the side chain 652 is a duration for which an asset must be locked on the main chain 252 before it can be transferred to the side chain 652. The purpose of this confirmation period is to allow for multi-signature of the multi-access edge computing nodes 502M, 504M, i.e. for the witness multi-access edge computing nodes 502M to validate the locking of assets in the second data block 204. The obtaining of the multi-signatures of the multi-access edge computing nodes 502M, 504M makes a denial of service attack in the next waiting period (i.e. the contest period) more difficult. After waiting out the confirmation period, a transaction can be created on the side chain 652 referencing proof that it has been validated through consensus of the multi-access edge computing nodes 502M, 504M on the main chain 252.

The contest period is a duration in which a newly-transferred asset may not be spent on the side chain 652. The purpose of the contest period is to prevent double spending by transferring previously-locked assets. If at any point during this delay, a "conflicting" data block is raised for inclusion into the main chain 252 before the witness multi-access edge computing nodes 504M, which does not include the data block in which the assets are locked, the conversion is retroactively invalidated.

If there is lack of receipt of the "conflicting" data block, this signifies there is consensus amongst the witness multi-access edge computing nodes 504M, which verifies that the second block of data 204 with the locked assets is included in the main chain 252 (represented using the arrow 702 in FIG. 7). This causes the main chain 252 of data blocks to have at least one data block with a record of locked assets.

While locked on the main chain 252, the assets can be freely transferred within the side chain 652 without further interaction with the main chain 252. Transactions, determined to be based on the locked assets, can be recorded into one or more data blocks 706 of the side chain 652, without requiring for them to be validated by the protocol described in FIG. 2 which is in respect of the main chain 252. New transactions recorded into one or more data blocks 706 of the side chain 652 are validated when each new transaction can approve two previous transactions recorded in earlier data blocks of the side chain 652 by referencing these two earlier transactions. Validation at the side chain 652 therefore undergoes a simpler validation procedure compared to those validated on the main chain 252.

The locked asset retains its identity as a main chain 252 asset, and can only be transferred back to the same main chain 252 from which it came. The side chain 652 is linked to the data block of the main chain 252 with the locked assets, i.e. the second data block 204 of the main chain 252 is the root node of the side chain 652.

When assets are to be transferred from the side chain 652 back to the main chain 252, a peg-out transaction is made on the side chain 652. This transaction is checked by the witness multi-access edge computing nodes 504M which sign a transaction spending from a multi-signature wallet they control on the main chain 252. A threshold number (e.g. 66%) of the witness multi-access edge computing nodes 504M must sign before the main chain 252 transaction becomes valid. The witness multi-access edge computing nodes 504M then signs transactions on the side chain 652 that destroy a corresponding number of assets on the sidechain 652, effectively transferring the assets from the side chain 652 to the main chain 252 (represented using the arrow 704 in FIG. 7).

A use case scenario for the side chain 652 is provided as follows.

Figure 8:
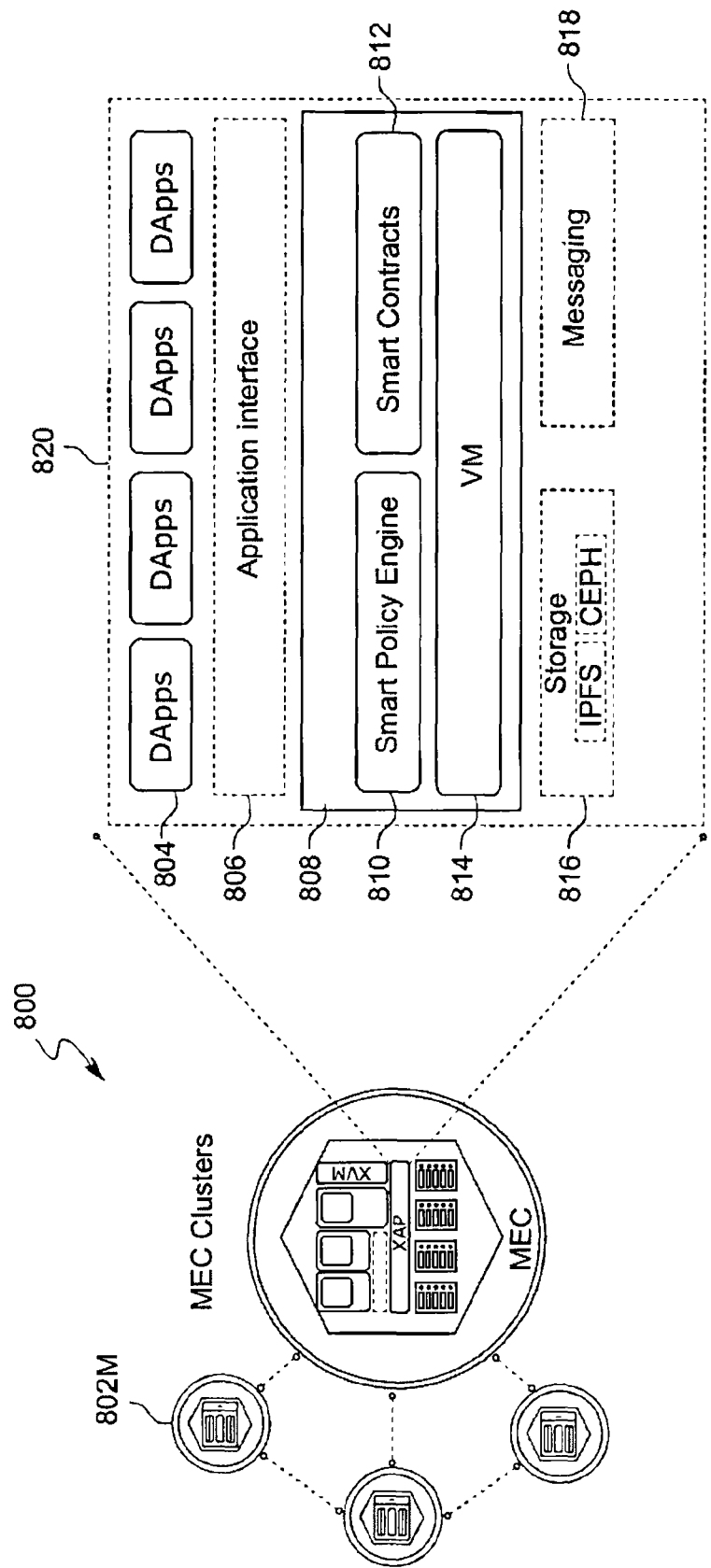
FIG. 8 provides a schematic of a multi-access edge computing node cluster configured to support data block deployment to allow diverse workload, orchestration and governance.

In one implementation, each sidechain 652 is defined by a custom "rule-set" and can be used to offload computations from another chain. Individual sidechains 652 can follow different sets of rules from the main chain 252, which means they can be optimised for applications that require extremely high speeds. Sidechains 652 can be understood as a discrete graph that is linked to the main chain 252 applied through a two-way peg. In this case, a DAG acts as a sidechain 652, where a machine writing transactions on the main chain 252 has to send their funds to an output address. Once the tokens are in the output address, they are locked-in. This means that the machine is no longer able to use the tokens. To ensure increased security, communication is sent across the main chain 252 and sidechain 652 and a waiting period is permitted after the machine's token is moved to the output address. Once the waiting period is over, the token is released to the side chain 652. The machine is then able to spend the tokens on the sidechain 652. When moving from the side chain 652 to the main chain 252, the machine sends the coins from the sidechain 652 to an output address where they are locked. After the waiting period is over, an equivalent number of tokens are transferred to the main chain 252. This acts as a two way synchronization between the two hybrid distributed ledgers, the first being realised by the main chain 252 and the second being realised by the side chain 652. The sidechain 652 provides many benefits: (1) The DAG sidechain 652 is independent from the main chain 252 that is firewalled, and is responsible for their own security without major risk to the integrity of the main chain 252. (2) DAG is known for scalability through parallel transactions in its own nature, with DAG being a layer 2 scaling that allows transactions to be conducted off the main chain 252, this can be scaled further with IoT. Thus, taking pressure off the main chain 252 and allows the main chain 252 to further accelerate transactions. (3) Supports two way pegged assets (side chains 652 issue an asset that is backed at a deterministic exchange rate to the main chain 252 assets) with interoperability. (4) The option to include a federated sidechain to add nodes in-between the main chain 252 and the side chain 652 through consensus FIG. 8 provides a schematic of a multi-access edge computing node cluster 800 comprising several multi-access edge computing nodes 802M, where each is configured to support data block deployment (both on the main chain 252 and the side chain 652, confer FIGS. 6 and 7) in accordance with the present invention to allow diverse workload, orchestration and governance that are policy driven. Each multi-access edge computing nodes 802M has an automation platform block 820 that serves as an operating interface to communicate with the distributed ledger, such as to check its status and to execute instructions. An overview of functions provided by the automation platform 820 is provided below.

Smart contracts exist as one or more decentralised applications or distributed ledger applications that run on an application layer 804. These smart contracts are written in code that is compliant with rules of an application interface layer 806, so that the smart contracts can work with the distributed ledger provided by the deployed data blocks. Examples of smart contracts include applications that enable IoT services to tap into the blockchain deployed by the multi-access edge computing nodes 802M, these services including, but not limited to, augmented reality (AR), virtual reality (VR) or facial recognition.

A management block 808 comprises a smart policy engine block 810, a smart contracts block 812 and a virtual machine (VM) block 814. With reference to FIGS. 6 and 7, the smart policy engine block 810 determines which of the protocol 200 of the first layer and the protocol 650 of the second layer is used to process smart contracts. When the smart contracts employ encryption to shield sensitive data (like personal particulars of parties executing the smart contracts and digital wallets used to fund them), the smart policy engine block 810 also processes the output of zero knowledge protocols that are supported by each of the multi-access edge computing nodes 802M, these protocols being described in greater detail in FIG. 10. The smart policy engine block 810 thus helps to manage data blocks that get generated from transactions effected by smart contracts written into the chained data blocks. In one implementation, where access to a dedicated processor is available (described later in FIG. 10), the smart policy engine block 810 also allocates computational load between the dedicated processor and a stock processor of the multi-access edge computing node 802M. The virtual machine block 814 is used to provide a runtime environment to provide a system of data manipulated rules that need to be followed to create compliant smart contract.

A storage block 816 manages the recordation of smart contract transactions into data blocks into the distributed ledger (either that of the main chain 252 or the side chain 652). The storage block 816 also manages peripheral data associated with the smart contract transaction, such as but not limited to an identity of IoT devices that are parties to the smart contract transaction and data generated by the decentralised applications that run on the application layer 804. The data blocks are stored in accordance with any peer-to-peer distributed file system standard, such as InterPlanetary File System (IPFS) and "Ceph" from Redhat®. Such a standard supports the hybrid protocol described in FIGS. 6 and 7.

A messaging block 818 is used for data communication or to enter instructions.

Figure 9:
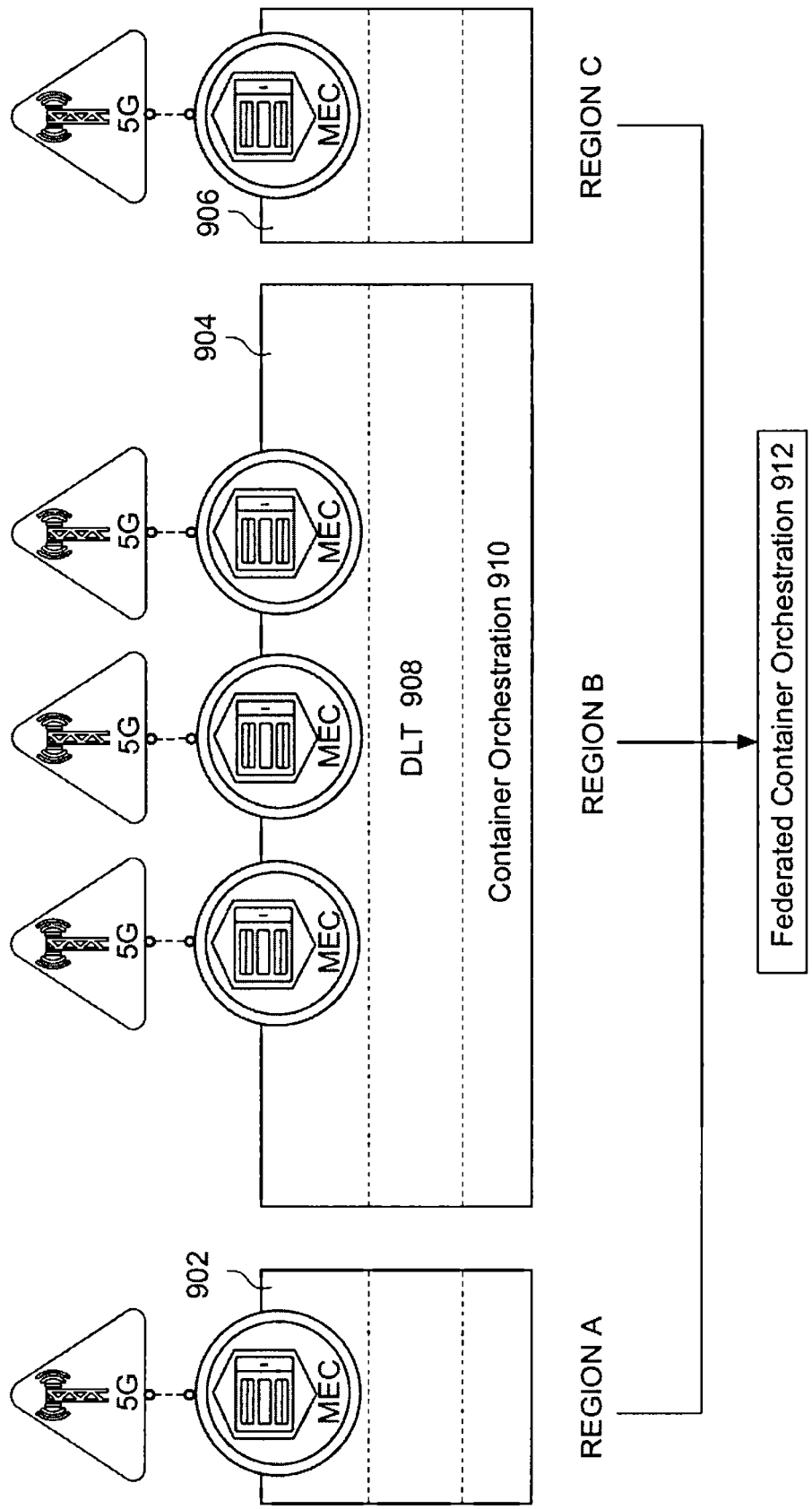
FIG. 9 provides a schematic of multi-access edge computing node clusters each residing in different regions through federated container orchestration.

FIG. 9 provides a schematic of multi-access edge computing node clusters 902, 904 and 906, each residing in different regions A, B and C. The distributed ledger DLT 908 that the clusters 902, 904 and 906 host, in accordance with the present invention, is schematically shown.

FIG. 9 shows an ecosystem of interconnected multi-access edge computing node clusters 902, 904 and 906 in a federated network that uses container orchestration 910. In more detail, each node of the clusters 902, 904 and 906 runs a container image which is a lightweight, standalone, executable package of software that includes everything needed to run the distributed ledger: code, runtime, system tools, system libraries and settings. Container orchestration 910 provisions, schedules and manages containers at scale for decentralized applications/distributed ledger applications (DApps) residing in such containers.

DApps services are orchestrated across the multi-access edge computing node clusters 902, 904 and 906. A federated container is where these containers are managed in clusters, so that federated container orchestration 912 is present since these multi-access edge computing node clusters 902, 904 and 906 may belong to different operator networks. The federated container orchestration 912 may be realised by open source operating system level virtualization.

Federated container orchestration 912 allows for consistent deployment of DApps in each multi-access edge computing node of the clusters 902, 904 and 906, therefore allowing the DApps to perform efficiently and reliably. Extrapolating, federated container orchestration 912 facilitates deployment of a suite of distributed ledger applications across the multi-access edge computing node clusters 902, 904 and 906, wherein each of the applications is configured to interface with the distributed ledger DLT 908. That is, the suite of distributed ledger applications is already coded to work on the distributed ledger DLT 908 and output data in a compatible format for inclusion into the chained data block shared by the distributed ledger DLT 908. As earlier explained, distributed ledger applications are programs coded to support smart contracts written into the distributed ledger DLT 908. Under federated container orchestration 912, the suite of distributed ledger applications are coded to comply with regulations imposed in a jurisdiction to which each of the multi-access edge computing node clusters 902, 904 and 906 belongs. That is, should a contract be executed between a party in region A and a party in region B, regulatory requirements in both regions A and B are automatically met, since a distributed ledger application supporting the execution of the contract in region A complies with regulatory requirements of region A, while a distributed ledger application supporting the execution of the contract in region B complies with regulatory requirements of region B. A solution to implement cross border transactions is thereby implemented. Additionally, each cluster 902, 904 and 906 shares service discovery, so that a back-end resource is accessible from any other cluster. If one container fails, another one will be created automatically.

It will be appreciated that the various functions described thus far (e.g. data block generation, smart contract execution and smart policy engine management) are controlled through a central processing unit (CPU) of the multi-access edge computing node. The CPU is formed by one or more core processors having such functionality after software installation that writes instructions that perform the necessary arithmetic and logic operations to execute the functions into the register of the operating system of the multi-access edge computing node. The term "stock processor" refers to such a CPU, which is part of standard technical specifications of the multi-access edge computing node.

Figure 10:
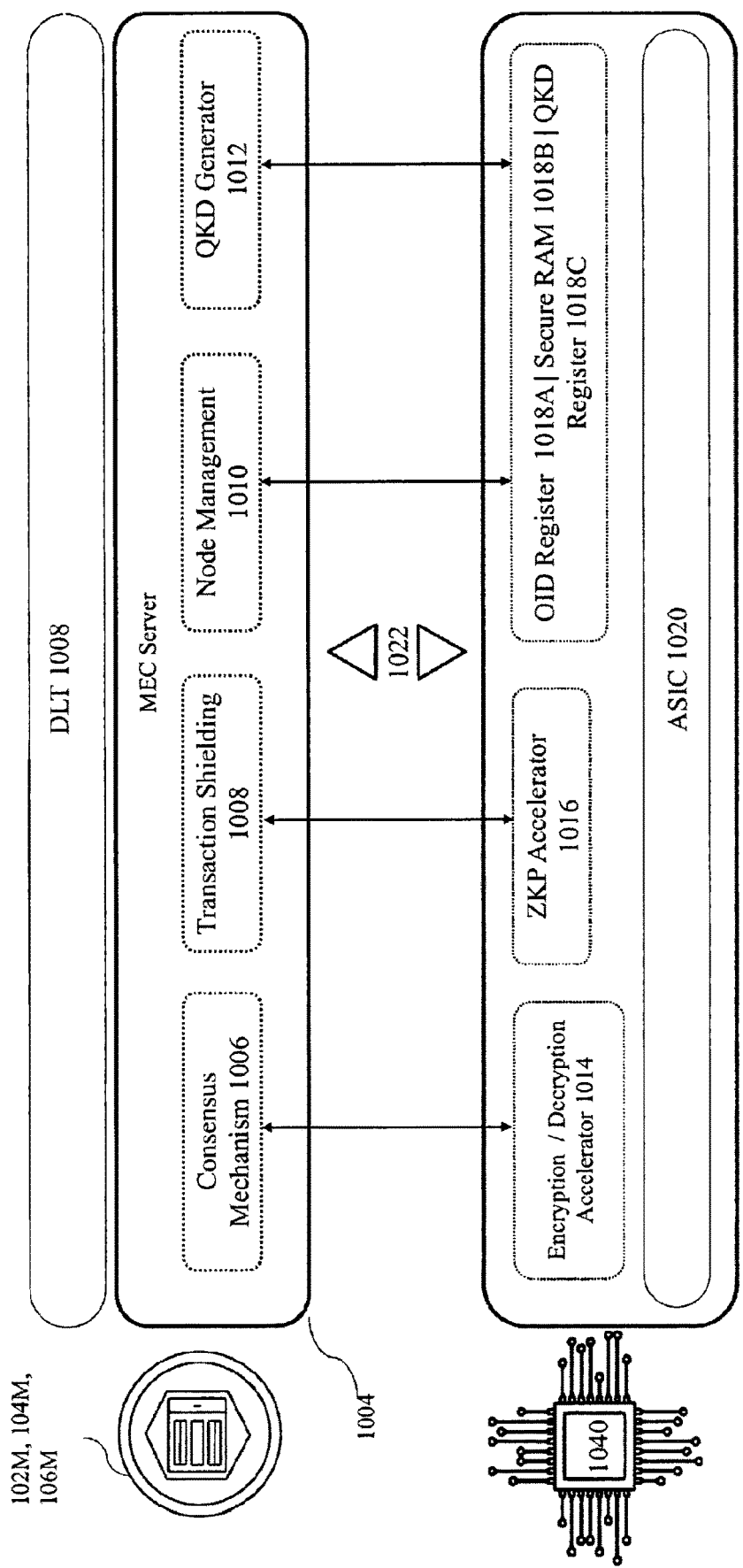
FIG. 10 is a schematic of functions that are executed by a stock processor of each of the multi-access edge computing nodes of FIG. 1 and a schematic of a dedicated processor designed to share the computational load of the stock processor of the multi-access edge computing nodes to execute these functions.

FIG. 10 shows a non-exhaustive schematic of functions 1004 that are executed by the stock processor of each of the multi-access edge computing nodes 102M, 104M and 106M of FIG. 1 when implementing a distributed ledger DLT 1008. A schematic of a dedicated processor 1040 designed to share the computational load of the stock processor of the multi-access edge computing nodes 102M, 104M and 106M to execute these functions is also shown. The dedicated processor 1040, as opposed to the stock processor, is a processor that is specifically designed to share the computationally heavy workload of the stock processor encountered during data block deployment. As such, the architecture of the dedicated processor 1040 is equipped with logic partitions that are catered for such data block deployment.

The functions 1004 include determination of a consensus mechanism 1006, transaction shielding 1008, node management 1010 and a quantum key generator 1012.

With reference to FIGS. 6 and 7, the consensus mechanism 1006 refers to offloading computation workload (encryption/decryption) that occurs when executing the consensus mechanism described in FIGS. 2, 6 and 7.

Transaction shielding 1008 refers to addressing privacy and security concerns in the distributed ledger DLT 1008, through the use of zero knowledge protocols. ZKP allow entities to store only the proof of the transaction on a node. They keep the sensitive data to themselves, while still maintaining confidence in a connected record of provenance.

A zero-knowledge protocol is a method by which one party (the prover) can prove to another party (the verifier) that something is true, without revealing any information apart from the fact that this specific statement is true. Zero-knowledge proofs (ZKP) validate the truth of something without revealing how the truth is known or share the content of this truth with the verifier. This principle is based on an algorithm that takes some data as input and returns either 'true' or 'false'. ZKP must satisfy three criteria:

1. Completeness: if the statement is true, the honest verifier (that is, one following the protocol properly) will be convinced of this fact by an honest prover.

2. Soundness: if the statement is false, no cheating prover can convince the honest verifier that it is true, except with some small probability.

3. Zero-knowledge: if the statement is valid, no verifier learns anything other than the fact that the statement is true. In other words, just knowing the statement (not the secret) is sufficient to imagine a scenario showing that the prover knows the secret. This is formalized by showing that every verifier has some simulator that, given only the statement to be proved (and no access to the prover), can produce a transcript that "looks like" an interaction between the honest prover and the verifier in question.

The first two of these are properties of more general interactive proof systems. The third is what makes the proof zero-knowledge.

A zero-knowledge protocol, in line with the above principles, is applied by the transaction shielding 1008 function when the multi-access edge computing nodes 102M, 104M and 106M detect that a current transaction for recordation as a new data block into the distributed ledger DLT 1008 contains shielded data (e.g. an identity of the parties to a smart contract transaction: details of a digital wallet used to fund the smart contract transaction: messages or set of instructions between both or multiple parties on the distributed ledger) to authenticate the shielded data. Authentication of the shielded data reduces to arithmetic operations where an output of logic level "1" or "0" determines whether the content of the shielded data is known. The output of the zero knowledge protocol determines whether the current transaction is able to proceed with validation (i.e. can be recorded as a new data block into the blockchain).

When either or both of the stock processor and the dedicated processor 1040 of the multi-access edge computing nodes 102M, 104M and 106M detects that shielded data is present, these processor(s) identifies existence, within the current transaction, of statements designed to prove a truth about whether content of the shielded data is known, with the shielded data being masked or encrypted. Such statements serve as means to evidence that a transaction is sound because the shielded data is masked and cannot be analysed to make such a decision. The identified statements may be formulated depend on the principles of the zero-knowledge proof upon which algorithms are based. The algorithms accept specific data as input and returns whether the identified statements are either 'true' or 'false'. The processor(s) evaluates a truth of the identified statements and if determined that it is true that the content of the shielded data is known, authenticates the shielded current transaction. While absolute certainty is not guaranteed, the statements are formulated such that affirmative results reflect a high degree of probability of the current transaction being sound, which then allows for the current transaction to be recorded as a new data block, as set out in FIGS. 2, 6 and 7.

When evaluating the truth of the identified statements, the processor(s) of the multi-access edge computing nodes 102M, 104M and 106M is further configured to determine that the identified statements are evaluated to be true by each of a group of external multi-access edge computing nodes. That is, taking the perspective of the multi-access edge computing node 102M as an example, consensus is reached by each of the multi-access edge computing nodes 104M and 106M that is also evaluating the truth of the one or more identified statements. The consensus may follow the approach as described in FIG. 2.

A first approach bases the statements used to establish the validity of the current transaction on a zero-knowledge Succinct Non-Interactive ARgument of Knowledge (zk-SNARK). This is a protocol which creates a framework in which the current transaction—submitted for validation by a multi-access edge computing node (e.g. 102M, see FIG. 1) called prover—can quickly convince other multi-access edge computing nodes (e.g. 104M and 106M, see FIG. 2)—called verifier—that the prover knows a secret without revealing anything the secret.

The protocol realises circuits with inputs of 0 or 1 and an output of 0 or 1. The prover knows a string (0, 1, . . . , 1) that will result in a 0 output. The prover's secret is this string, which in one implementation is based on the details of the data that is being shielded and in another implementation may be arbitrarily generated. In order to convince the verifier that the prover knows a string that has an output of 0, the prover gives a proof n to the verifier. The verifier checks this proof. If the proof is correct, the verifier can be sure that the prover blows a correct string.

A Quadratic Arithmetic Program (QAP) provides the prover with tools to construct the proof $\pi$ for the claim that the prover knows a valid assignment $(a_1, \ldots, a_N) \in F^N$ for a circuit C. A QAP $Q(C) := (\vec{A}, \vec{B}, \vec{C}, Z)$ for a given arithmetic circuit C provides three sets of polynomials $$\vec{A} = (A_i(z))_{i=0}^m, \vec{B} = (B_i(z))_{i=0}^m, \vec{C} = (C_i(z))_{i=0}^m \ (m \geq N)$$

with coefficients in F, and a target polynomial $Z(z) \in F[z]$ such that: The polynomial $Z(z)$ divides the polynomial $$P(z) := \underbrace{\left(A_0(z) + \sum_{i=1}^m a_i A_i(z)\right)}_{:=A(z)} \underbrace{\left(B_0(z) + \sum_{i=1}^m a_i B_i(z)\right)}_{:=B(z)} - \underbrace{\left(C_0(z) + \sum_{i=1}^m a_i C_i(z)\right)}_{:=C(z)}$$

if and only if $(a_1, \ldots, a_N)$ is a valid assignment for the circuit C. The prover constructs $P(z)$ for his proof $\pi$, and the verifier can check the divisibility property of $P(z)$ by $Z(z)$.

Another approach uses a one-time trusted setup to generate a private/public key pair that is used to generate statements used to establish the validity of the current transaction. The private part is destroyed and from the public part another key pair is generated, producing a proving key and a verification key. The proving key and the verification key are distributed to provide a common reference shared between the prover and the verifier. A current transaction to be recorded into the distributed ledger of the multi-access edge computing nodes 102M, 104M and 106M contains a computation created from the distributed prover key, for example by using a given public input and the prover key to generate a proof. The processor(s) of the multi-access edge computing nodes 102M, 104M and 106M, in realising its role as the "verifier", is configured to obtain the distributed verifying key that corresponds to the distributed prover key. The processor(s) evaluates the computation using the distributed verifying key and permits for the validation to proceed (i.e. for a new data block to be recorded) in response to the evaluation of the computation producing a correct output.

A second approach to evaluate the truth of the statements used to establish the validity of the current transaction uses an interactive approach.

An interactive proof system <P, V> for an algorithm L is zero-knowledge if for any verifier V* there exists an expected simulator S such that $$\forall x \in L, z \in \{0,1\}^*, \text{View}_{V^*}[P(x) \leftrightarrow V^*(x,z)] = S(x,z)$$

The definition states that an interactive proof system <P, V> is zero-knowledge if for any verifier V there exists an efficient simulator S that can essentially produce a transcript of the conversation that would have taken place between P and V on any given input. Therefore, having a conversation with P cannot teach V* to compute something she could not have computed before. The string z in the definition plays the role of "prior knowledge" (including the random coins of V*); V* cannot use any prior knowledge string z to mine information out of its conversation with P because the requirement is that if S is also given this prior knowledge then it can reproduce the conversation between V * and P just as before.

In the interactive approach, the processor(s) of the multi-access edge computing nodes 102M, 104M and 106M is configured to iterate the identified statements through at least one test: and conclude that the statements are true when a majority of the iterations produce a consistent result.

Turning to node management 1010, this refers to monitoring operation of the dedicated chip 1040, such as its register 1018A, RAM 1018B and QKD (Quantum Key Distribution) register 1018C. The register 1018A holds a unique ID of the dedicated chip 1040. This ID is written into the register 1018A during manufacturing. The same ID is protected and stored on the DLT 1008. It is possibility to add more than one register 1018A into the dedicated chip 1040.

The RAM 1018B provides cache for the dedicated chip 1040. The QKD register 1018C stores cryptographic keys used by the dedicated chip 1040, the stock processor or both.

The quantum key generation 1012 is responsible for selecting a zero knowledge protocol from the QKD register 1018C for use when analysing transactions with shielded data.

When a transaction is to be recorded into the distributed ledger DLT 1008, the computation required can be drawn from both the processor of the multi-access edge computing nodes 102M, 104M and 106M and the dedicated processor 1040. The dedicated processor 1040 is designed to share the computational load of the stock processor of the multi-access edge computing nodes 102M, 104M and 106M by being partitioned into logic blocks 1014, 1016 and 1018. Each block has electronics designed to share execution of a respective one of the functions of the processor through a combination of suitably connected logic gates. In an ASIC (application-specific integrated circuit) 1020 implementation, a semiconductor substrate is fabricated with logic gates from a library of components in accordance with a circuitry schematic that is specifically catered to support the distributed ledger DLT 1008.

An encryption/decryption accelerator block 1014 shares computational load with the consensus mechanism 1006. A ZKP (zero knowledge protocol) accelerator block 1016 shares computational load with the transaction shielding 1008. A OID Register/Secure RAT/QKD Register block provides storage for data associated with the node management 1010 and the QKD generator 1012. Communication between the dedicated processor 1040 and the processor of the multi-access edge computing nodes 102M, 1044 and 106M is through a high speed bus 1022. The high speed bus 1022 may run on any one or more of the following connection protocols: USB2.0. 3.X, PCIe, SATA. NVMe.

Figure 11:
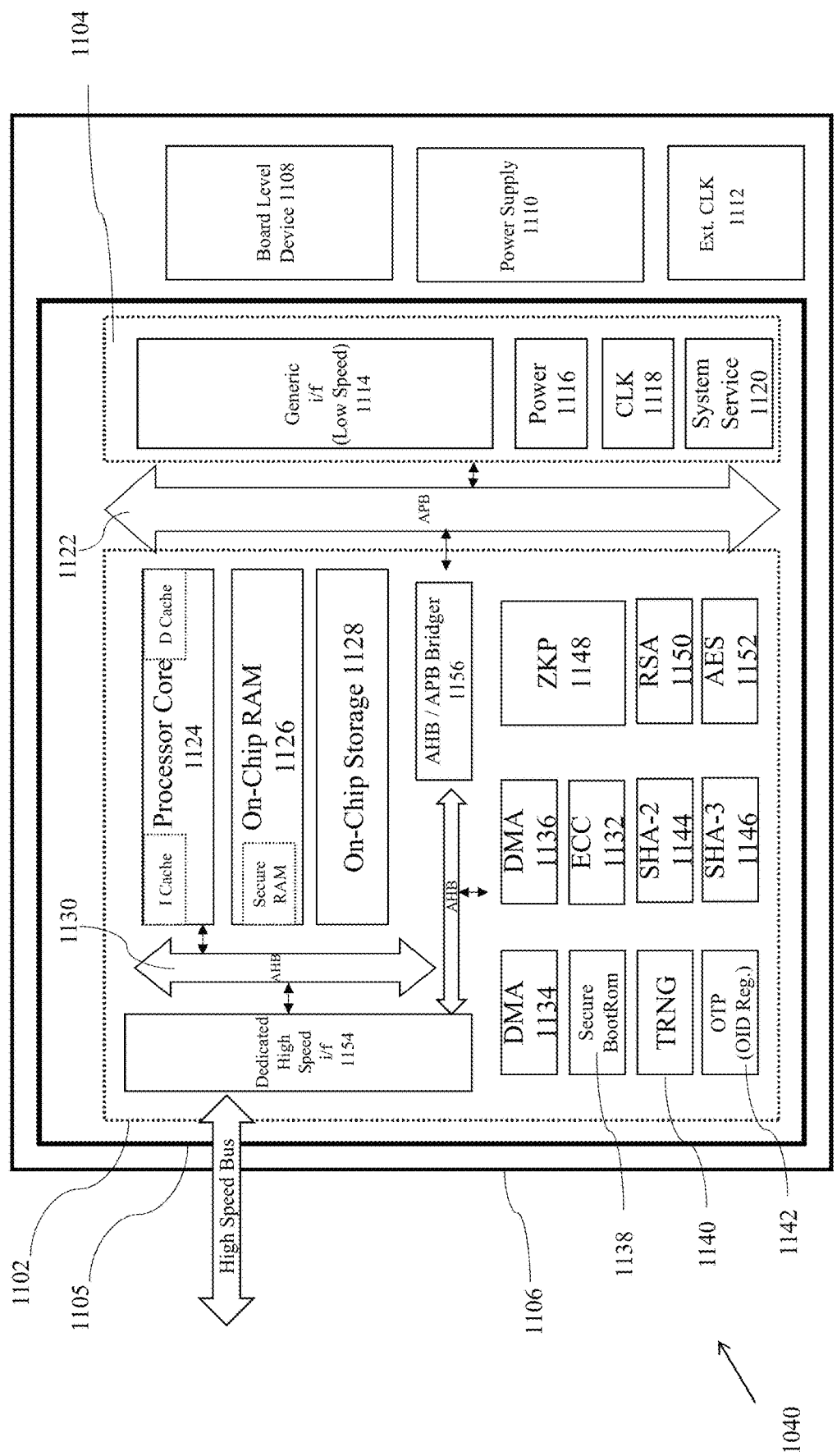
FIG. 11 shows an architecture of the dedicated processor of FIG. 10.

FIG. 11 shows a layout of the dedicated processor 1040 of FIG. 10. The dedicated processor 1040 is for installation at a multi-access edge computing node located within a cellular coverage area supported by a base station of a mobile network operator, such as any one of the multi-access edge computing nodes 102M, 104M and 106M and their associated base stations 102, 104 and 106 described in FIG. 1. The dedicated processor 1040 may be provided as a removable dongle, mounted on a printed circuit board or integrated to a motherboard or electronic circuit board on which the stock processor of the multi-access edge computing nodes 102M, 104M and 106M is mounted, through the high speed bus 1022 mentioned in FIG. 10.

Within a board 1106 on which the dedicated processor 1040 is mounted, the dedicated processor 1040 has electronics divided into logic partitions spread over a secure area 1102 and a non-secure area 1104 of a chip boundary 1105. These electronics include numerous elementary logic gates of AND, OR, XOR, NOT. NAND. NOR and XNOR configuration that are suitably connected to realise the function required from each logic partition.

The board 1106 has board level devices 1108, a power supply 1110 to power the components of the dedicated processor 1040 and an external clock 1112.

The non-secure area 1104 has its own power segment 1116, a generic interface 1114, a clock 1118 and a system service 1120. Communication between the non-secure area 1104 and the secure area 1104 occurs over an APB (advanced peripheral bus) 1122.

The components of the secure area 1102 are as follows: a processor core 1124, an on-chip RAM 1126, an on-chip storage 1128, direct memory access (DMA) modules 1134 and 1136, error correction code memory 1132 (for correcting internal data corruption), secure boot ROM 1138, a true random number generator (TRNG) 1140, a one time programmable (OTP) section 1142 providing one or more areas where each can be used to store data like the serial number of the dedicated chip with interconnection fuses being subsequently blown, and encryption modules: SHA-2 1144, SHA-3 1146; ZKP 1148; RSA 1150 and AES 1152.

The processor core 1124 communicates with the encryption modules over an advanced high performance bus (AHB) 1130. The SHA-2 1144 and SHA-3 1146 modules provide the secure hash algorithms used to hash data blocks in the blockchain described in FIGS. 2, 6 and 7. The ZKP 1148 module provides the zero knowledge protocols to process transactions having shielded data, as described in FIG. 10. The RSA 1150 module provides Rivest-Shamir-Adleman compliant algorithms, while the AES 1152 module provides advanced encryption standard algorithms that may be used during processing of a transaction for recording in the blockchain. The processor core 1124 also uses the AHB 1130 to communicate with external components (such as the stock processor of a multi-access edge computing node) through a high speed interface 1154 or to the non-secure area 1104 through a bridger 1156.

With reference to FIG. 10, one or more components of the secure area 1102 is called upon to facilitate computation required to be undertaken by the stock processor to realise the functions 1004. For instance, one or more components of the secure area 1102 become activated to provide a ledger management partition that is configured to share computational load of the stock processor of the multi-access edge computing node to include a new data block, to record a current transaction in respect of a good or service, into a chained data block stored in at least one memory of the multi-access edge computing node on which the dedicated processor 1040 is installed. The new data block is recorded in response to a signature, generated from processing the data of the current transaction with coded data of past transactions stored in the chained data block, being validated by a group of external multi-access edge computing nodes which are trusted. The ledger management partition may include the processor core 1124 sending instructions to the SHA-2 1144, SHA-3 1146, RSA 1150, AES 1152 and ECC 1132 modules to perform the hashing required to record a new data block is described in FIG. 2.

FIGS. 6 and 7 describe that the distributed ledger can record a new data block into a main chain 252 or a side chain 652, depending on the processing power required to record the new data block. To allow for the implementation of the side chain 652, the ledger management partition may be further configured to share computational load of the stock processor of the multi-access edge computing node to: lock assets in at least one data block of the main chain 252. The dedicated processor 1040 then records transactions, determined to be based on the locked assets, into one or more data blocks of the side chain 652: and assists to link the side chain 652 to the data block of the main chain 252 with the locked assets.

One or more components of the secure area 1102 become activated to provide a shielded transaction validation partition that is configured to share computational load of the stock processor of the multi-access edge computing node to process transactions with shielded data, being data which is meant to be kept confidential and not shared.

In the case where the shielded transaction validation partition detects transactions with such shielded data. The shielded transaction validation partition uses zero-knowledge proof that seek to authenticate the shielded data through the application of arithmetic operations which reduce to an output of logic level "1" or "0" to determine whether the content of the shielded data is known. The output of the zero knowledge protocol determines whether the current transaction is able to proceed with validation (i.e. can be recorded as a new data block into the blockchain). The shielded transaction validation partition seeks to locate statements designed to prove a truth about whether content of the shielded data is known, with the arithmetic operations being applied onto such statements, with the shielded data being masked or encrypted. The identified statements may be formulated depend on the principles of the zero-knowledge proof. If evaluation of the identified statements indicate that it is true that the content of the shielded data is known, this authenticates the shielded data and allows for the current transaction to be recorded as a new data block, as set out in FIGS. 2, 6 and 7.

When evaluating the truth of the identified statements, the shielded transaction validation partition may be further configured to determine that the identified statements are evaluated to be true by each of a group of external multi-access edge computing nodes. That is, consensus is reached by each of the multi-access edge computing nodes that is also evaluating the truth of the one or more identified statements.

One approach bases the statements used to authenticate the hidden data is based on a zero-knowledge Succinct Non-Interactive ARgument of Knowledge (zk-SNARK). For example, a one-time trusted setup to generate a private/public key pair is used to generate statements used to establish the validity of the current transaction. The private part is destroyed and from the public part another key pair is generated, producing a proving key and a verification key. The proving key and the verification key are distributed to provide a shared common reference. A current transaction to be recorded into the distributed ledger contains a computation created from the distributed prover key, for example by using a given public input and the prover key to generate a proof. The shielded transaction validation partition is configured to obtain the distributed verifying key that corresponds to the distributed prover key. The shielded transaction validation partition evaluates the computation using the distributed verifying key and permits for the validation (i.e. for a new data block to be recorded) to proceed in response to the evaluation of the computation producing a correct output.

Another approach evaluates the truth of the statements used to authenticate the shielded data through an interactive approach. The shielded transaction validation partition may be further configured to iterate the identified statements through at least one test; and conclude that the statements are true when a majority of the iterations produce a consistent result.

In the case where the shielded transaction validation partition detects that a current transaction contains data that requires shielding, the shielded transaction validation partition proceeds to shield such data. The shielded transaction validation partition then formulates statements designed to prove a truth about whether content of the shielded data is known, with the shielded data being masked.

Figure 12:
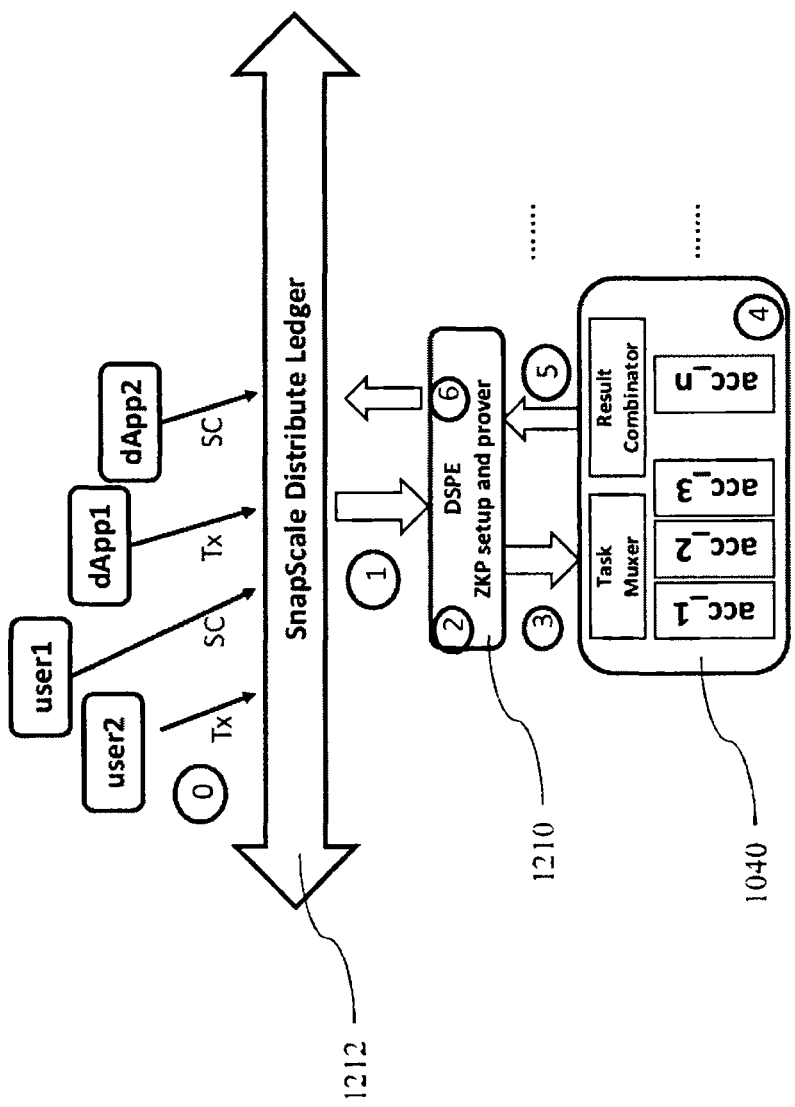
FIG. 12 provides a flow that demonstrates how a smart policy engine 1210 operating on a stock processor of a multi-access edge computing node works with the dedicated processor of FIG. 11.

FIG. 12 provides a flow that demonstrates how a smart policy engine 1210 (also confer reference numeral 810 of FIG. 8) operating on a stock processor of a multi-access edge computing node works with the dedicated processor 1040 of FIG. 11 to implement the distributed ledgers described in FIGS. 2, 6 and 7.

At step 0, a transaction takes place, which may be a simple nano transaction (Tx) to be recorded on a side chain (confer FIGS. 6 and 7) or a transaction with smart contract (SC) to be recorded on a main chain. The transactions may or may not require data shielding and its associated zero knowledge protocol.

At step 1, the smart policy engine 1210 acts as a communication bridge between the distributed ledger 1212 and the dedicated processor 1040. The smart policy engine 1210 will collect the required tasks and amount of zero knowledge proof (ZKP) to process from the distributed ledger 1212.

At step 2, the smart policy engine 1210 organises the tasks in a pool and assigns ZKP transaction priorities. The smart policy engine 1210 may split the pools into "Large pool", "Medium Pool" or "Small Pool"

At step 3, the prioritisation setup is completed and instruction sets are sent to the dedicated processor 1040 one at a time, depending on the policy defined by the smart policy engine 1210.

At step 4, the dedicated processor 1040 includes an internal task mixer that is responsible for issuing jobs to embedded multiple accelerators (acc_1, acc_2_n) inside the dedicated processor 1040. The computation is completed within a predefined window. A combinator will collectively combine all the computing results in a batch.

At step 5, the dedicated processor 1040 sends the results back to the smart policy engine 1210.

At step 6, the smart policy engine 1210 will complete a ZKP masked package that is delivered to the distributed ledger 1212 for validation.

Figure 13:
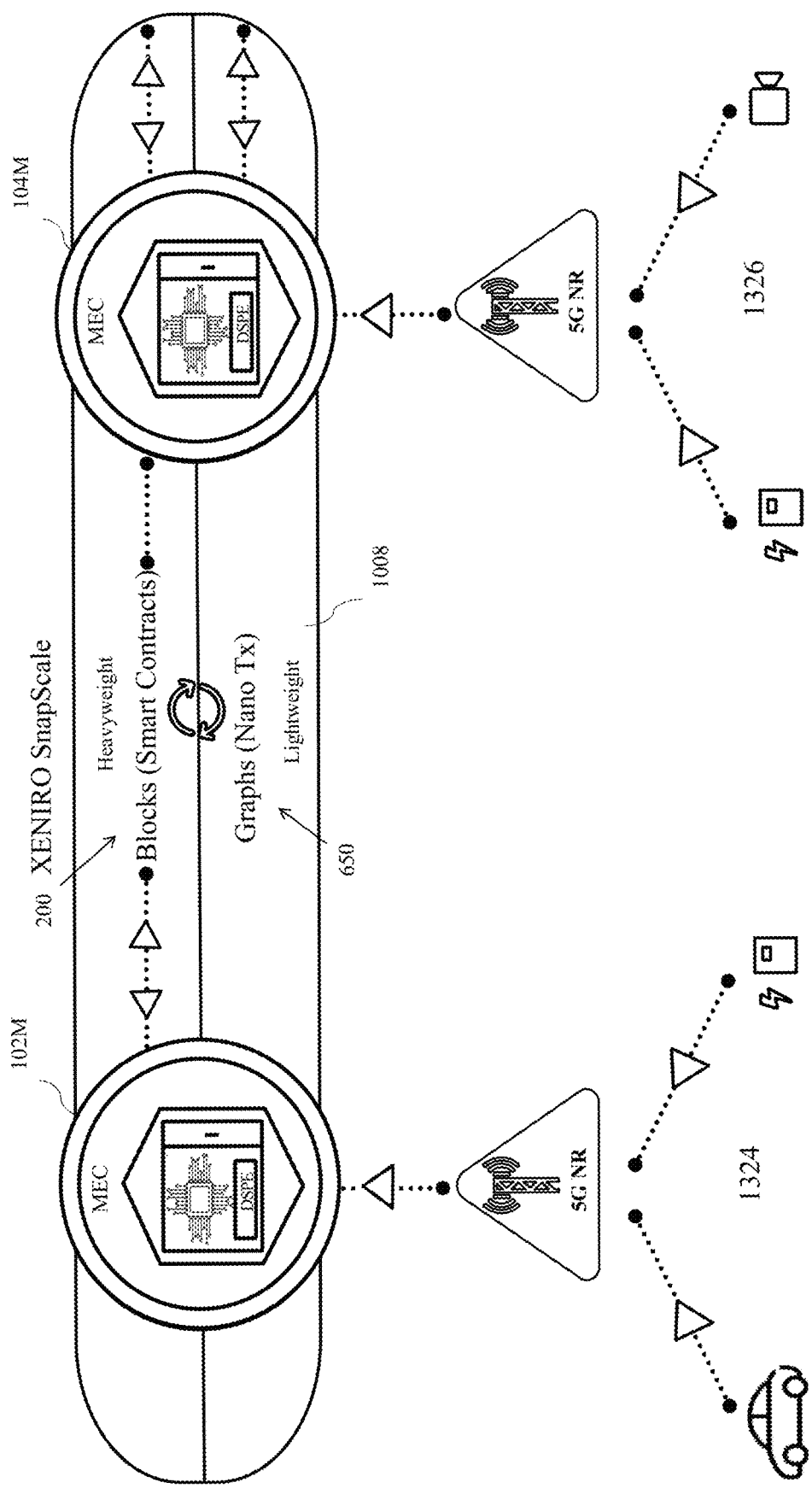
FIG. 13 is a schematic of a system comprising a distributed ledger that is implemented by a processor of the multi-access edge computing nodes of FIG. 1 sharing computational load with the dedicated processor of FIG. 11.

FIG. 13 is a schematic of a system comprising a distributed ledger 1008 that is implemented by a processor of the multi-access edge computing nodes 102M and 104M of FIG. 1 sharing computational load with the dedicated processor 1040 of FIG. 11.

With the dedicated processor 1040 being connected to the stock processor of the multi-access edge computing nodes 102M and 104M, all functions are boosted. Protocols 200 and 650 that record transactions of use cases 1324 and 1326 into the distributed ledger 1008 execute faster. Use case 1324 demonstrates a heavy weight smart contract transaction through layer 1 (confer reference numeral 200) and use case 1326 is a light weight nano transaction through layer 2 (confer reference numeral 650) accelerating performance and consensus on the distributed ledger 1008 supported by the dedicated processor 1040.

The incorporation of the dedicated processor 1040 results in overall lower latency, boosts performance and supports privacy encryption.

Figure 14:
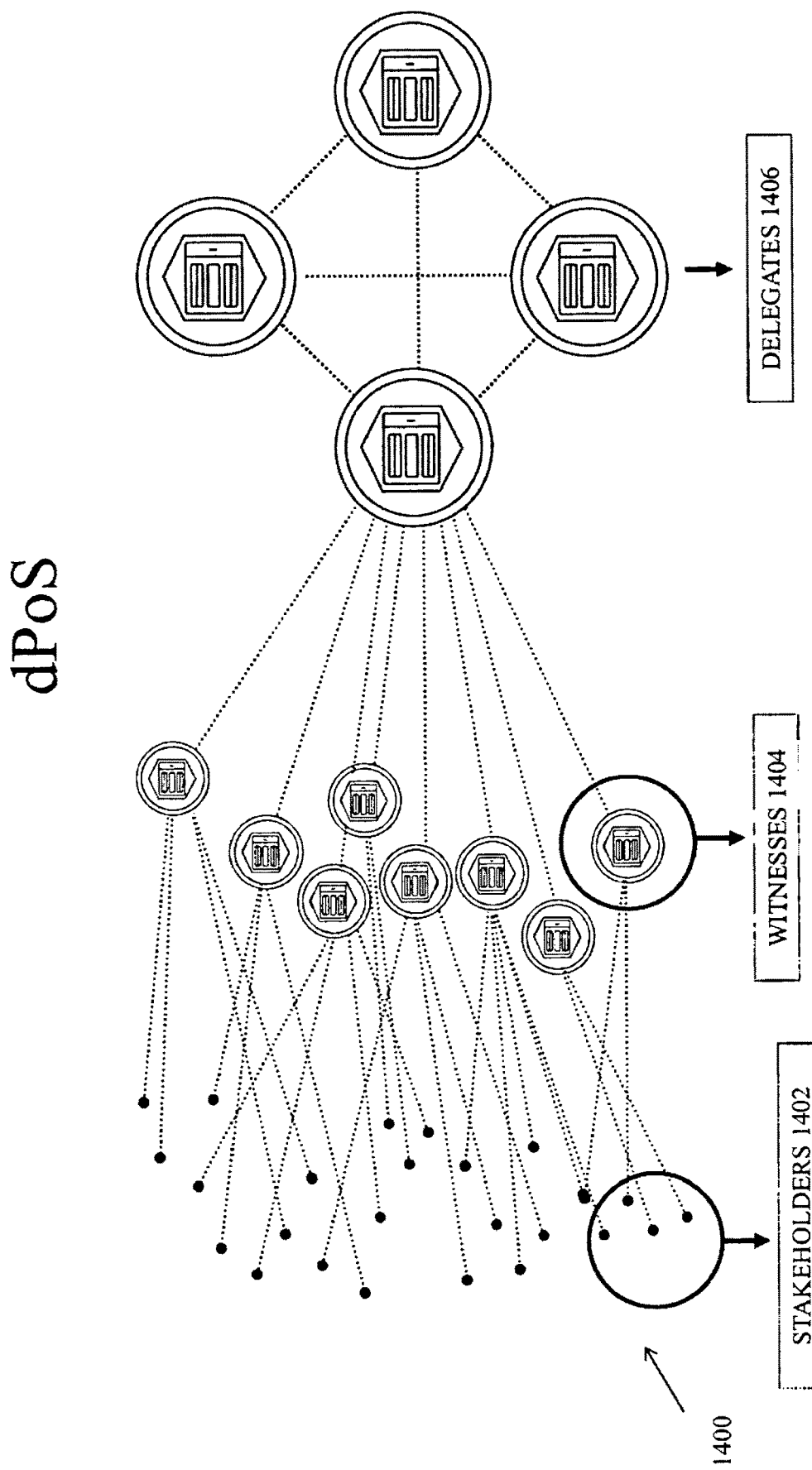
FIG. 14 is a schematic to explain how election of witness multi-access edge computing nodes is performed.

FIG. 14 is a schematic to explain how election of witness multi-access edge computing nodes 1406 is performed.

In a network 1400 comprising multi-access edge computing nodes that utilise a distributed ledger, stakeholders 1402 refer to the machines that hold utility tokens. These stakeholders 1402 continuously monitor for the best performing multi-access edge computing nodes and vote them to be trusted. The trusted multi-access edge computing nodes become witnesses 1404 that are allowed to update the distributed ledger with data of new transactions. Consensus has to be reached by a percentage of the witnesses 1404 (e.g. 66 or 67 of them). Delegates 1406 are made up from a consortium of mobile network operators, which have the power to propose changes to the network 1400 through stakeholder 1402 voting.

In the application, unless specified otherwise, the terms "comprising", "comprise", and grammatical variants thereof, intended to represent "open" or "inclusive" language such that they include recited elements but also permit inclusion of additional, non-explicitly recited elements. It will also be appreciated that the terms "information" and "data" are used interchangeably, especially when referring to recording transactions into a distributed ledger.

While this invention has been described with reference to exemplary embodiments, it will be understood by those skilled in the art that various changes can be made and equivalents may be substituted for elements thereof, without departing from the spirit and scope of the invention. In addition, modification may be made to adapt the teachings of the invention to particular situations and materials, without departing from the essential scope of the invention. Thus, the invention is not limited to the particular examples that are disclosed in this specification, but encompasses all embodiments falling within the scope of the appended claims.

REFERENCES 1. https://www.forbes.com/sites/louiscolumbous/2017/12/10/2017-roundup-of-internet-of-things-forecasts/#40aa818e1480

The invention claimed is:

1. A multi-access edge computing node located within a cellular coverage area supported by a base station of a mobile network operator, the multi-access edge computing node comprising
    at least one memory to store a chained data block, where each data block is coded with data of a past transaction in respect of a good or service;
    at least one stock processor; and
    a dedicated processor configured to share computational load of the stock processor, the dedicated processor having electronics divided into logic partitions comprising a shielded transaction validation partition that is configured to process transactions with shielded data using a zero-knowledge proof that seeks to authenticate the shielded data with the shielded data being masked;
    wherein the at least one stock processor is configured with functions that:
    include a new data block, to record a current transaction in respect of a good or service, into the chained data block in response to a signature, generated from processing the data of the current transaction with the coded data of the past transactions stored in the chained data block, being validated by a group of external multi-access edge computing nodes, wherein the multi-access edge computing node and the group of external multi-access edge computing nodes are trusted, and communicate over a common channel, wherein the current transaction for recordation is received by the multi-access edge computing node that is closest to a device on which the transaction is initiated;
    provide for a policy engine that evaluates the current transaction for recordation under a main chain or a side chain, at an instance when the current transaction is performed and records the current transaction in either the main chain or the side chain in response to the evaluation, wherein to optimize recording of transactions in respect of a good or service, data blocks are recorded in the side chain before synchronization of data blocks in the main chain with the transactions that are recorded in the side chain; and
    direct for the shielded transaction validation partition of the dedicated processor to process transactions with shielded data using the zero-knowledge proof, wherein output of the zero-knowledge proof determines whether the transaction is to be recorded as a new data block;
    wherein the transactions stored in the chained data block comprise data related to smart contract execution.

2. The multi-access edge computing node of claim 1, wherein the stock processor is configured with further functions that:
    lock assets in at least one data block of the main chain;
    record transactions, determined to be based on the locked assets, into one or more data blocks of the side chain; and
    link the side chain to the data block of the main chain with the locked assets.

3. The multi-access edge computing node of claim 2, wherein the stock processor is configured with further functions that:
    write the transactions recorded in the data blocks in the side chain into one or more data blocks of the main chain when updating the main chain of the expenditure of the locked assets resulting from transactions recorded in the side chain.

4. The multi-access edge computing node of claim 1, wherein the stock processor is configured with further functions that upon determination that the current transaction contains shielded data:
    analyse the current transaction using a zero knowledge protocol configured to authenticate the shielded data; and
    process an output of the zero knowledge protocol, wherein the output determines whether the current transaction is able to proceed with the validation.

5. The multi-access edge computing node of claim 4, wherein the zero knowledge protocol has the stock processor being further configured with further functions that:
    identify existence, within the current transaction, of statements designed to prove a truth about whether content of the shielded data is known, with the shielded data being masked;
    evaluate the identified statements; and
    permit for the validation to proceed in response to the evaluation proving that the shielded data is known.

6. The multi-access edge computing node of claim 5, wherein the stock processor is further configured with further functions that:
    determine that a same evaluation of the identified statements is reached by each of the group of external multi-access edge computing nodes.

7. The multi-access edge computing node of claim 5, wherein the statements are based on a computation created from a distributed prover key, wherein the stock processor is further configured with further functions that:
- obtain a distributed verifying key corresponding to the distributed prover key;
- evaluate the computation using the distributed verifying key; and
- permit for the validation to proceed in response to the evaluation of the computation producing a correct output.

8. The multi-access edge computing node of claim 5, wherein to evaluate the truth of the identified statements, the stock processor is further configured with further functions that:
- iterate the identified statements through at least one test; and
- conclude that the statements are true when a majority of the iterations produce a consistent result.

9. The multi-access edge computing node of claim 4, wherein the stock processor is configured with further functions that provides for a policy engine that is configured to decide whether to record the current transaction in either the main chain or the side chain and process the output of the zero knowledge protocol.

10. The multi-access edge computing node of claim 1, wherein the common channel lies along a path used by the base station supporting the multi-access edge computing node to communicate with a base station having a cellular coverage area within which each of group of the external multi-access edge computing node is located.

11. The multi-access edge computing node of claim 1, wherein the stock processor is configured with further functions that copy the chained data block into the at least one memory from the group of external multi-access edge computing nodes in response to receipt of an accompanying security certificate authenticating chained data blocks.

12. The multi-access edge computing node of claim 1, wherein each of the data blocks in the chained data block comprises a hash of the data in a preceding data block.

13. The multi-access edge computing node of claim 1, wherein the data related to smart contract execution comprises any one or more of terms in a purchase and sales contract; crediting and debiting of a digital wallet; tracking of resources in a supply chain; streaming of media content; managing power usage; and monitoring of road traffic conditions.

14. The multi-access edge computing node of claim 1, wherein the dedicated processor is: provided as a removable dongle, mounted on a printed circuit board or integrated to a circuit board on which the stock processor is mounted.

15. The multi-access edge computing node of claim 1, wherein the multi-access edge computing node is located adjacent to the base station.

16. The multi-access edge computing node of claim 1, wherein data communication in respect of inclusion of the new data block occurs within 4G or 5G frequency bands.

17. A method of deploying a suite of distributed ledger applications across a plurality of multi-access edge computing nodes, the method comprising:
- executing an image containing the suite of distributed ledger applications across the plurality of multi-access edge computing nodes; and
- outputting, by the plurality of multi-access edge computing nodes associated with the distributed ledger applications, data in a compatible format for inclusion into a chained data block;
- sharing, by a dedicated processor, computational load of a stock processor, the dedicated processor having electronics divided into logic partitions comprising a shielded transaction validation partition that is configured to process transactions with shielded data using a zero-knowledge proof that seeks to authenticate the shielded data with the shielded data being masked;
- including a new data block, to record a current transaction in respect of a good or service, into the chained data block in response to a signature, generated from processing the data of the current transaction with coded data of past transactions stored in the chained data block, being validated by a group of external multi-access edge computing nodes, wherein the multi-access edge computing node and the group of external multi-access edge computing nodes are trusted, and communicate over a common channel, wherein the current transaction for recordation is received by the multi-access edge computing node that is closest to a device on which the transaction is initiated;
- providing for a policy engine that evaluates the current transaction for recordation under a main chain or a side chain, at an instance when the current transaction is performed and records the current transaction in either the main chain or the side chain in response to the evaluation, wherein to optimize recording of transactions in respect of a good or service, data blocks are recorded in the side chain before synchronization of data blocks in the main chain with the transactions that are recorded in the side chain; and
- directing for the shielded transaction validation partition of the dedicated processor to process transactions with shielded data using the zero-knowledge proof, wherein output of the zero-knowledge proof determines whether the transaction is to be recorded as a new data block;
- wherein the transactions stored in the chained data block comprise data related to smart contract execution.

18. The method of claim 17, further comprising:
- coding the suite of distributed ledger applications to comply with regulations imposed in a jurisdiction to which each of the plurality of multi-access edge computing nodes belongs.

19. The multi-access edge computing node of claim 1, wherein the logic partitions of the dedicated processor further comprise:
- a ledger management partition configured to share computational load of a stock processor of the multi-access edge computing node to include a new data block, to record a current transaction in respect of a good or service, into a chained data block stored in at least one memory of the multi-access edge computing node on which the dedicated processor is installed, in response to a signature, generated from processing the data of the current transaction with coded data of past transactions stored in the chained data block, being validated by a group of external multi-access edge computing nodes which are trusted; and
- wherein the shielded transaction validation partition is further configured to:
- produce shielded data comprising data of the current transaction determined to require shielding; and
- formulate statements designed to prove a truth about whether content of the shielded data is known, with the shielded data being masked.

20. The multi-access edge computing node of claim 19, wherein the ledger management partition of the dedicated processor is further configured to share computational load of the stock processor of the multi-access edge computing node to:
- lock assets in at least one data block of the main chain;
- record transactions, determined to be based on the locked assets, into one or more data blocks of the side chain; and
- link the side chain to the data block of the main chain with the locked assets.

* * * * *